(12) United States Patent
Brinig et al.

(10) Patent No.: US 11,688,225 B2
(45) Date of Patent: *Jun. 27, 2023

(54) FACILITATING DIRECT RENDEZVOUS FOR A NETWORK SERVICE

(71) Applicant: Uber Technologies, Inc., San Francisco, CA (US)

(72) Inventors: Kevin Brinig, San Francisco, CA (US); Fahrettin Olcay Cirit, San Francisco, CA (US); Margaret-Ann Julia Seger, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/307,741

(22) Filed: May 4, 2021

(65) Prior Publication Data
US 2021/0256794 A1   Aug. 19, 2021

Related U.S. Application Data

(63) Continuation of application No. 16/864,477, filed on May 1, 2020, now Pat. No. 11,030,843, which is a (Continued)

(51) Int. Cl.
*G07F 17/00* (2006.01)
*G05D 1/00* (2006.01)
(Continued)

(52) U.S. Cl.
CPC ....... *G07F 17/0057* (2013.01); *G05D 1/0088* (2013.01); *G06K 7/1095* (2013.01);
(Continued)

(58) Field of Classification Search
CPC combination set(s) only.
See application file for complete search history.

(56) References Cited

U.S. PATENT DOCUMENTS 4,550,304 A   10/1985   Saitta
5,168,451 A   12/1992   Bolger
(Continued)

FOREIGN PATENT DOCUMENTS

AU   2019261826   12/2019
AU   2018259218   3/2021
(Continued)

OTHER PUBLICATIONS

Grimm, Nicholas Justin. "A Low-Cost Contactless Micro-Payment Framework." University of Johannesburg (South Africa), pp. 1-234, 2014 (Year: 2014).*

(Continued)

*Primary Examiner* — Amber A Misiaszek
(74) *Attorney, Agent, or Firm* — Mahamedi IP Law LLP

(57) ABSTRACT

A computing system can receive, over the one or more networks, a request for a service from a client device of a user. In response to receiving the request, the system can generate a unique identifier for the request to facilitate a rendezvous between the user and a service provider, and transmit the unique identifier to the client device of the user. Based on the user and the service provider making the rendezvous, the system receives data corresponding to the unique identifier from a provider application executing on a client device of the service provider. Based on receiving the data corresponding to the unique identifier from the client device of the service provider, the system updates a status for the user to indicate that the service has been provided by the service provider for the user.

20 Claims, 10 Drawing Sheets

Related U.S. Application Data continuation of application No. 16/360,858, filed on Mar. 21, 2019, now Pat. No. 10,706,659, which is a continuation of application No. 16/148,895, filed on Oct. 1, 2018, now Pat. No. 10,304,277, which is a continuation of application No. 15/350,905, filed on Nov. 14, 2016, now Pat. No. 10,192,387, which is a continuation of application No. 15/292,055, filed on Oct. 12, 2016, now Pat. No. 10,325,442.

(51) Int. Cl.
```
G06K 7/10      (2006.01)
G06K 7/14      (2006.01)
G06Q 50/30     (2012.01)
H04W 4/021     (2018.01)
G06Q 10/0631   (2023.01)
```

(52) U.S. Cl.
CPC ..... *G06K 7/1417* (2013.01); *G06Q 10/06311* (2013.01); *G06Q 50/30* (2013.01); *H04W 4/021* (2013.01)

(56) References Cited

U.S. PATENT DOCUMENTS

| | | |
|---|---|---|
| 5,212,645 A | 5/1993 | Wildes et al. |
| 5,604,676 A | 2/1997 | Penzias |
| 5,945,919 A | 8/1999 | Trask |
| 6,028,537 A | 2/2000 | Suman |
| 6,212,393 B1 | 4/2001 | Suarez |
| 6,356,838 B1 | 3/2002 | Paul |
| 6,618,593 B1 | 9/2003 | Drutman |
| 6,756,913 B1 | 6/2004 | Ayed |
| 6,874,037 B1 | 3/2005 | Abram |
| 6,925,381 B2 | 8/2005 | Adamcyzk |
| 6,950,745 B2 | 9/2005 | Agnew |
| 6,989,765 B2 | 1/2006 | Gueziec |
| 7,062,376 B2 | 6/2006 | Oesterling |
| 7,080,019 B1 | 7/2006 | Hurzeler |
| 7,610,145 B2 | 10/2009 | Kantarjiev |
| 7,822,426 B1 | 10/2010 | Wuersch |
| 8,140,256 B1 | 3/2012 | dos-Santos |
| 8,285,571 B2 | 10/2012 | Demirdjian |
| 8,362,894 B2 | 1/2013 | Shah |
| 8,489,119 B1 | 7/2013 | Fraccaroli |
| 8,554,608 B1 | 10/2013 | O'Connor |
| 8,646,194 B2 | 2/2014 | Podd |
| 8,799,038 B2 | 8/2014 | Chen et al. |
| 8,909,256 B2 | 12/2014 | Fraccaroli |
| 9,299,255 B2 * | 3/2016 | Yarnold ............... G08G 1/205 |
| 9,483,744 B2 | 11/2016 | Lord |
| 9,488,484 B2 * | 11/2016 | Lord ............... G06Q 50/30 |
| 9,552,559 B2 | 1/2017 | Lord |
| 9,558,469 B2 | 1/2017 | Lord |
| 9,569,740 B2 | 2/2017 | Lord |
| 9,599,481 B2 | 3/2017 | Lord |
| 9,671,239 B2 | 6/2017 | Lord |
| 9,689,694 B2 | 6/2017 | Lord |
| 9,715,667 B2 | 7/2017 | Lord |
| 9,892,637 B2 | 2/2018 | Demisse |
| 9,965,960 B1 | 5/2018 | McDavitt-Van Fleet |
| 9,978,282 B2 * | 5/2018 | Lambert ............... G08G 1/123 |
| 10,111,043 B1 | 10/2018 | Cirit |
| 10,192,387 B2 | 1/2019 | Brinig |
| 10,304,227 B2 | 5/2019 | Brinig |
| 10,325,442 B2 | 6/2019 | Brinig |
| 10,341,819 B2 | 7/2019 | Cirit |
| 10,355,788 B2 | 7/2019 | Cirit |
| 10,706,659 B2 | 7/2020 | Brinig |
| 10,728,708 B2 | 7/2020 | Cirit |
| 11,277,209 B2 | 3/2022 | Cirit |
| 2007/0011324 A1 | 1/2007 | Mehr |
| 2011/0000747 A1 | 1/2011 | Wu |
| 2011/0009098 A1 | 1/2011 | Kong |
| 2011/0099040 A1 | 4/2011 | Felt et al. |
| 2011/0102165 A1 | 5/2011 | Rahamim |
| 2011/0118981 A1 | 5/2011 | Chamlou |
| 2011/0145089 A1 | 6/2011 | Khunger |
| 2011/0153629 A1 | 6/2011 | Lehmann et al. |
| 2011/0161227 A1 | 6/2011 | Santo, Jr. |
| 2011/0225269 A1 | 9/2011 | Yap et al. |
| 2011/0258623 A1 | 10/2011 | Wagner |
| 2011/0301985 A1 | 12/2011 | Camp et al. |
| 2011/0301997 A1 | 12/2011 | Gale et al. |
| 2011/0320230 A1 | 12/2011 | Podgumy |
| 2012/0041675 A1 | 2/2012 | Juliver et al. |
| 2012/0059693 A1 | 3/2012 | Colodny et al. |
| 2012/0078671 A1 | 3/2012 | Mohebbi |
| 2012/0092194 A1 | 4/2012 | Crucs |
| 2012/0131170 A1 * | 5/2012 | Spat ............... H04L 67/04 709/223 |
| 2012/0137256 A1 | 5/2012 | Lalancette |
| 2012/0171963 A1 | 7/2012 | Tsfaty |
| 2012/0203599 A1 | 8/2012 | Choi |
| 2012/0214416 A1 | 8/2012 | Kent |
| 2012/0232943 A1 | 9/2012 | Myr |
| 2013/0024249 A1 | 1/2013 | Zohar |
| 2013/0024308 A1 | 1/2013 | Ramaswamy |
| 2013/0054139 A1 | 2/2013 | Bodin |
| 2013/0054281 A1 | 2/2013 | Thakkar |
| 2013/0073327 A1 | 3/2013 | Edelberg |
| 2013/0074111 A1 | 3/2013 | Hyde et al. |
| 2013/0090963 A1 | 4/2013 | Sharma |
| 2013/0102333 A1 | 4/2013 | Dam |
| 2013/0132140 A1 | 5/2013 | Amin |
| 2013/0144831 A1 | 6/2013 | Atlas |
| 2013/0150004 A1 | 6/2013 | Rosen |
| 2013/0171930 A1 | 7/2013 | Anand |
| 2013/0179215 A1 | 7/2013 | Slinin |
| 2013/0290200 A1 | 10/2013 | Singhal |
| 2013/0295963 A1 | 11/2013 | Sen |
| 2013/0316727 A1 | 11/2013 | Edge |
| 2013/0332527 A1 | 12/2013 | Du |
| 2014/0011522 A1 * | 1/2014 | Lin ............... H04W 4/02 455/456.2 |
| 2014/0051465 A1 | 2/2014 | Ruys et al. |
| 2014/0067488 A1 | 3/2014 | James |
| 2014/0081764 A1 | 3/2014 | James |
| 2014/0082069 A1 | 3/2014 | Varoglu et al. |
| 2014/0087697 A1 | 3/2014 | Johnston |
| 2014/0129135 A1 | 5/2014 | Holden et al. |
| 2014/0129951 A1 | 5/2014 | Amin |
| 2014/0130387 A1 | 5/2014 | Podd |
| 2014/0149544 A1 | 5/2014 | Le Nerriec |
| 2014/0156556 A1 | 6/2014 | Lavian |
| 2014/0164559 A1 | 6/2014 | Demeniuk |
| 2014/0172727 A1 | 6/2014 | Abhyanker |
| 2014/0223787 A1 | 8/2014 | Richmond |
| 2015/0032484 A1 | 1/2015 | Mermelstein |
| 2015/0046080 A1 | 2/2015 | Wesselius |
| 2015/0127439 A1 | 5/2015 | Campos De Figueiredo Faceira |
| 2015/0154810 A1 | 6/2015 | Tew |
| 2015/0161554 A1 | 6/2015 | Sweeney |
| 2015/0161564 A1 | 6/2015 | Sweeney |
| 2015/0161752 A1 | 6/2015 | Barreto |
| 2015/0195133 A1 | 7/2015 | Sheets |
| 2015/0204684 A1 | 7/2015 | Rostamian |
| 2015/0228000 A1 | 8/2015 | Bijor |
| 2015/0248689 A1 | 9/2015 | Paul |
| 2015/0262430 A1 | 9/2015 | Farrelly |
| 2015/0279217 A1 | 10/2015 | Chen |
| 2015/0310868 A1 | 10/2015 | Mallik |
| 2015/0317568 A1 | 11/2015 | Grasso |
| 2015/0323327 A1 | 11/2015 | Lord |
| 2015/0323329 A1 | 11/2015 | Lord |
| 2015/0323330 A1 | 11/2015 | Lord |
| 2015/0323331 A1 | 11/2015 | Lord |
| 2015/0323335 A1 | 11/2015 | Lord |
| 2015/0323336 A1 | 11/2015 | Lord |
| 2015/0324334 A1 | 11/2015 | Lord |
| 2015/0324717 A1 | 11/2015 | Lord |
| 2015/0324718 A1 | 11/2015 | Lord |
| 2015/0324729 A1 | 11/2015 | Lord |

(56) References Cited

U.S. PATENT DOCUMENTS

| | | |
|---|---|---|
| 2015/0324734 A1 | 11/2015 | Lord |
| 2015/0324945 A1 | 11/2015 | Lord |
| 2015/0325158 A1 | 11/2015 | Lord |
| 2015/0332425 A1 | 11/2015 | Kalanick |
| 2015/0339923 A1 | 11/2015 | Konig |
| 2015/0345743 A1 | 12/2015 | Trincia |
| 2015/0345951 A1 | 12/2015 | Dutta |
| 2015/0348408 A1 | 12/2015 | Demisse |
| 2015/0356803 A1 | 12/2015 | Ellis |
| 2016/0019728 A1 | 1/2016 | Petrie |
| 2016/0026935 A1 | 1/2016 | Botea |
| 2016/0027306 A1 | 1/2016 | Lambert |
| 2016/0034828 A1* | 2/2016 | Sarawgi ............... G06Q 10/00 705/5 |
| 2016/0034845 A1 | 2/2016 | Hiyama |
| 2016/0042303 A1 | 2/2016 | Medina |
| 2016/0117610 A1 | 4/2016 | Ikeda |
| 2016/0132792 A1 | 5/2016 | Rosnow |
| 2016/0138928 A1 | 5/2016 | Guo |
| 2016/0161266 A1 | 6/2016 | Crawford |
| 2016/0180346 A1 | 6/2016 | Cheng et al. |
| 2016/0198319 A1 | 7/2016 | Huang |
| 2016/0300318 A1 | 10/2016 | Godil |
| 2016/0334232 A1 | 11/2016 | Zhuang |
| 2016/0356615 A1 | 12/2016 | Arata |
| 2016/0364678 A1 | 12/2016 | Cao |
| 2016/0364824 A1 | 12/2016 | Bryant |
| 2016/0377445 A1 | 12/2016 | Rodoni |
| 2016/0378303 A1 | 12/2016 | Crilley |
| 2017/0011324 A1 | 1/2017 | Truong |
| 2017/0017374 A1 | 1/2017 | Herz |
| 2017/0038948 A1 | 2/2017 | Le Cun |
| 2017/0072844 A1 | 3/2017 | Kalanick |
| 2017/0126810 A1 | 5/2017 | Kentley |
| 2017/0138749 A1 | 5/2017 | Pan |
| 2017/0186126 A1 | 6/2017 | Marco |
| 2017/0193404 A1 | 7/2017 | Yoo |
| 2017/0213160 A1 | 7/2017 | Yerli |
| 2017/0267166 A1 | 9/2017 | Kalanick et al. |
| 2017/0300848 A1 | 10/2017 | Shoval |
| 2017/0308824 A1 | 10/2017 | Lord |
| 2018/0003843 A1 | 1/2018 | Hori et al. |
| 2018/0071634 A1 | 3/2018 | Carvallo |
| 2018/0081496 A1 | 3/2018 | Bhardwaj |
| 2018/0091603 A1 | 3/2018 | Nickels |
| 2018/0101925 A1 | 4/2018 | Brinig |
| 2018/0102017 A1 | 4/2018 | Brinig |
| 2018/0178717 A1 | 6/2018 | Kalanick |
| 2018/0180426 A1 | 6/2018 | Pan |
| 2018/0198535 A1 | 7/2018 | Cirit |
| 2018/0232789 A1 | 8/2018 | Bijor |
| 2018/0268329 A1 | 9/2018 | Lord |
| 2018/0310135 A1 | 10/2018 | Cirit |
| 2019/0014445 A1 | 1/2019 | Cirit |
| 2019/0035202 A1 | 1/2019 | Brinig |
| 2019/0051174 A1 | 2/2019 | Haque |
| 2019/0087754 A1 | 3/2019 | Farrelly |
| 2019/0095849 A1 | 3/2019 | Sweeney |
| 2019/0109910 A1 | 4/2019 | Sweeney |
| 2019/0152382 A1 | 5/2019 | Kalanick |
| 2019/0205812 A1 | 7/2019 | Afzal |
| 2019/0206009 A1 | 7/2019 | Gibson |
| 2019/0221069 A1 | 7/2019 | Brinig |
| 2019/0274010 A1 | 9/2019 | Cirit |
| 2019/0320043 A1 | 10/2019 | Goldstein |
| 2019/0327003 A1 | 10/2019 | Cirit |
| 2020/0013020 A1 | 1/2020 | Yang |
| 2020/0145503 A1 | 5/2020 | Sweeney |
| 2020/0173979 A1 | 6/2020 | Nickels |
| 2020/0258344 A1 | 8/2020 | Brinig |
| 2020/0269750 A1 | 8/2020 | Kalanick |
| 2020/0374650 A1 | 11/2020 | Jung |
| 2021/0227049 A1 | 7/2021 | Demiralp |
| 2021/0256794 A1 | 8/2021 | Jung |
| 2021/0262810 A1 | 8/2021 | Le Cun |
| 2021/0364302 A1 | 11/2021 | Nickels |
| 2022/0158745 A1 | 5/2022 | Cirit |

FOREIGN PATENT DOCUMENTS

| | | |
|---|---|---|
| BR | 112019013757 | 1/2020 |
| CA | 2889853 | 5/2014 |
| CA | 3059762 | 4/2018 |
| CA | 3048145 | 7/2018 |
| CA | 3061281 | 11/2018 |
| CA | 3038490 | 12/2019 |
| CN | 201918124 | 8/2011 |
| CN | 202213529 | 5/2012 |
| CN | 102934393 | 2/2013 |
| CN | 104463509 | 3/2015 |
| CN | 104885386 | 9/2015 |
| CN | 105871903 | 8/2016 |
| CN | 106170795 | 11/2016 |
| CN | 106209876 | 12/2016 |
| CN | 109120497 | 1/2019 |
| CN | 110301106 | 10/2019 |
| CN | 111601241 | 8/2020 |
| CN | 111832788 | 10/2020 |
| EP | 3566338 | 11/2019 |
| EP | 3616063 | 10/2020 |
| GB | 2473831 | 3/2011 |
| JP | 1992027220 | 5/1990 |
| JP | 2000082199 | 3/2000 |
| JP | 2002-133592 | 5/2002 |
| JP | 2003-531505 | 10/2003 |
| JP | 2004-302941 | 10/2004 |
| JP | 2004-362271 | 12/2004 |
| JP | 2005-107942 | 4/2005 |
| JP | 2006-227672 | 8/2006 |
| JP | 2006-339810 | 12/2006 |
| JP | 3934985 | 6/2007 |
| JP | 2012088925 | 5/2012 |
| JP | 2014-130552 | 6/2014 |
| JP | 2014-238831 | 12/2014 |
| JP | 2004-073639 | 5/2015 |
| JP | 2016-157395 | 9/2016 |
| JP | 6218057 | 10/2017 |
| JP | 2016157395 | 2/2018 |
| JP | 6836651 | 3/2021 |
| JP | 2021100251 | 7/2021 |
| KR | 10-2010-0053717 | 5/2010 |
| KR | 10-2012-0090480 | 8/2012 |
| KR | 10-1013-08531 | 9/2013 |
| KR | 10-2014-0124137 | 10/2014 |
| KR | 10-2015-0045962 | 4/2015 |
| WO | WO 1999/044186 | 2/1999 |
| WO | WO 2005/013588 | 2/2005 |
| WO | WO 2003/040972 | 5/2005 |
| WO | WO-2009023295 | 2/2009 |
| WO | WO 2011067741 | 6/2011 |
| WO | WO 2011069170 | 6/2011 |
| WO | WO-20110069170 | 6/2011 |
| WO | WO 2014106617 | 7/2014 |
| WO | WO 2018128781 | 7/2018 |
| WO | WO-2018128781 | 7/2018 |
| WO | WO 2018/197962 | 11/2018 |

OTHER PUBLICATIONS

Office Action in BR 1220200245654 dated Feb. 4, 2021.
Office Action in CA 2,956,631 dated May 7, 2021.
ISR and Written Opinion in PCT/US2021/013677 dated Jun. 16, 2021.
Alfred Round, et al.: Future Ride: Adapting New Technologies to Paratransit in the United States, UC Transportation Center Berkeley, CA, UCTC No. 306 (1996).
Aloizio P. Silva, A Mobile Location-Based Vehicle Fleet Management Service Application, 0-7803-78482/03 2003, IEEE.
Andersson, Magnus, Peer-to-Peer Service Sharing Platforms: Driving Share and Share Alike on a Mass-Scale, Thirty Fourth International Conference on Information Systems, Milan 2013, pp. 1-15 (2013).

(56) References Cited

OTHER PUBLICATIONS

Branscombe, M.; Use your phone to control your car using MirrorLink (Aug. 1, 2012; Tech Radar, pp. 1-2, http://www.techradar.Com/news/car-tech/use-your-phone-to-control-your-car-sing-mirrorlink-1090628 (Year: 2012).
Dillow, C.: "Without Smarts, New York's 'Taxi of Tomorrow' is Really the Taxi of Yesterday" (Apr. 10, 2012); Popular Science, https://www.popsci.Com/cars/article/2012-04/without-connectivity-new-yorks-new-taxi-tomorrow-really-taxi-yesterday (Year: 2012).
EESR in EP 15745931.4 dated May 30, 2017.
EESR in EP 17859424.8 dated Aug. 5, 2019.
Exam Report in in 201647031195 dated Oct. 30, 2019.
Exam Report No. 1 in AU 2014386266 dated Feb. 14, 2020.
Exam Report No. 1 in AU 2015296265 dated Apr. 21, 2020.
Exam Report No. 1 in AU 2019200957 dated Apr. 15, 2020.
Exam Report No. 1 in AU2015214049 dated Nov. 5, 2019.
Exam Report No. 2 in AU 2014362378 dated May 7, 2020.
Exam Report No. 2 in AU 2015296265 dated Aug. 13, 2020.
Exam Report No. 2 in AU 2017/342747 dated Aug. 27, 2019.
Examination Report No. 1 in AU 2014362378 dated Sep. 18, 2019.
Examination Reported in AU 2017342747 dated Apr. 8, 2019.
Extended Search Report issued in EP 14869805.3 dated May 10, 2017.
First Examination Report in EP 14869806.3 dated May 4, 2018.
First Office Action in CN 2014800731753 dated Feb. 3, 2019.
First Office Action in CN 201780086102.1 dated Dec. 30, 2019.
Fu, et al., "On-Line and Off-Line Routing and Scheduling of Dial-a-Ride Paratransit Vehicles", Computer-Aided Civil and Infrastructure Engineering 14 (1999).
Hai Yang et al. "Equilibria of bilateral taxi-customer searching and meeting on networks", Transportation Research Part B., 2010, vol. 44, pp. 1067-1083.
How to book two cabs at the same time in Uber, Jun. 30, 2017 (https://fastandclean.org/ book-two-cabs-time-uber).
How to request multiple Uber vehicles, Aug. 15, 2013 (https://www.wikihow.com/ Request-Multiple-Uber-Vehicles.
International Preliminary Report on Patentability in PCT/US2015/014743 dated Aug. 18, 2016.
International Search Report and Written Opinion issued in PCT/US2016/062344 dated Jan. 31, 2017.
International Search report in PCT/US2016/016858 dated May 19, 2016.
International Search Report in PCT/US2015/014406 dated May 13, 2015.
International Search Report in PCT/US2015/014743 dated May 13, 2015.
International Search Report in PCT/US2015/034831 dated Sep. 24, 2015.
International Search Report in PCT/US2015/043654 dated Nov. 26, 2015.
International Search Report in PCT/US2017/053065 dated Sep. 22, 2017.
International Search Report in PCT/US2017/053065 dated Dec. 13, 2017.
IPRP in PCT/US2014/069602 dated Jun. 23, 2016.
IPRP in PCT/US2017/053065 dated Apr. 25, 2019.
Is it possible to order 2 Ubers at the same time, Jul. 13, 2015 (https://web.archive.org/web/20150801000000*/https://android.Stackexchange.com/questions/114027/is-it- possible-to-order-2-ubers-at-the-same-time.
ISR and Written Opinion in PCT/US2018/055256 dated Jan. 30, 2019.
ISR and Written Opinion issued in PCT/US2017/066859 dated Mar. 15, 2018.
ISR and Written Opinion issued in PCT/US2019/025659 dated Jul. 15, 2019.
Kikuchi, et al., "Advanced Traveler Aid Systems for Public Transportation", US Department of Transportation, Sep. 1994.
M.E.T. Horn, "Multimodal and demand-responsive passenger transport systems: a modeling framework with embedded control systems", Transportation Research Part A 36, 167-188 (2002) Year: 2000.
Notice of Allowance in KR 10-2019-7022998 dated Jan. 2, 2020.
OA in EP 17859424.8 dated Apr. 28, 2020.
Office Action dated Oct. 10, 2018 in AU 2017206210.
Office Action dated Nov. 8, 2018 in CN 201580031578.6.
Office Action dated Dec. 19, 2017 in Chinese Application No. 201508831578.6.
Office Action dated Dec. 4, 2018 in EP 15792139.6.
Office Action dated Feb. 15, 2018 in Australian Application No. 2017265095.
Office Action dated Feb. 6, 2019 in AU 2017265095.
Office Action dated Feb. 8, 2017 in Canadian App. No. 2,948,472.
Office Action dated Mar. 3, 2017 in Australian App. No. 2015259802.
Office Action dated Apr. 16, 2018 in Australian Application No. 2017206210.
Office Action dated Apr. 16, 2020 in EP 1670690.0.
Office Action dated Apr. 17, 2018 in Japanese Application No. 2016567642.
Office Action dated Jul. 3, 2018 in EP 15792139.6.
Office Action in AU 2017390194 dated Jul. 26, 2019.
Office Action in BR 1120170017768 dated May 6, 2020.
Office Action in BR 1120180097799 dated Aug. 27, 2020.
Office Action in CA 3048145 dated Jul. 29, 2019.
Office Action in CN 2015800072642 dated Nov. 26, 2018.
Office Action in CN 2015800072642 dated May 8, 2019.
Office Action in EP 15826501.7 dated May 14, 2019.
Office Action in EP15745931.4 dated Mar. 2, 2018.
Office Action in JP 2018-524399 dated Apr. 8, 2020.
Office Action in JP 2019-534853 dated Feb. 5, 2020.
Office Action in KR 10-2019-7022998 dated Sep. 2, 2019.
Robert Kuhlthau and Ira D. Jacobson, The Development of a Model for Predicting Passenger Acceptance of Short Haul Air Transportation Systems, NASA, Sep. 1977.
Second Office Action dated Sep. 27, 2019 in CN 2014800731753.
Written Opinion in PCT/US2018/055256 dated Jul. 19, 2019.
Written Opinion issued in SG 11201700669R dated Dec. 5, 2017.
Xing Wang, Optimizing Ride Matches for Dynamic Ride Sharing Systems, GIT, May 2013.
Office Action in CA 2,932,828 dated Feb. 8, 2021.
Summons to attend oral hearing in EP 17859424.8 dated Dec. 7, 2020.
Office Action in IN 201647042936 dated Dec. 23, 2020.

* cited by examiner

Rider App Interface 400

Late Binding State Notification 402

Mass Egress Location 412

Geo-Fence Area 414

Service Type Selection Feature 416

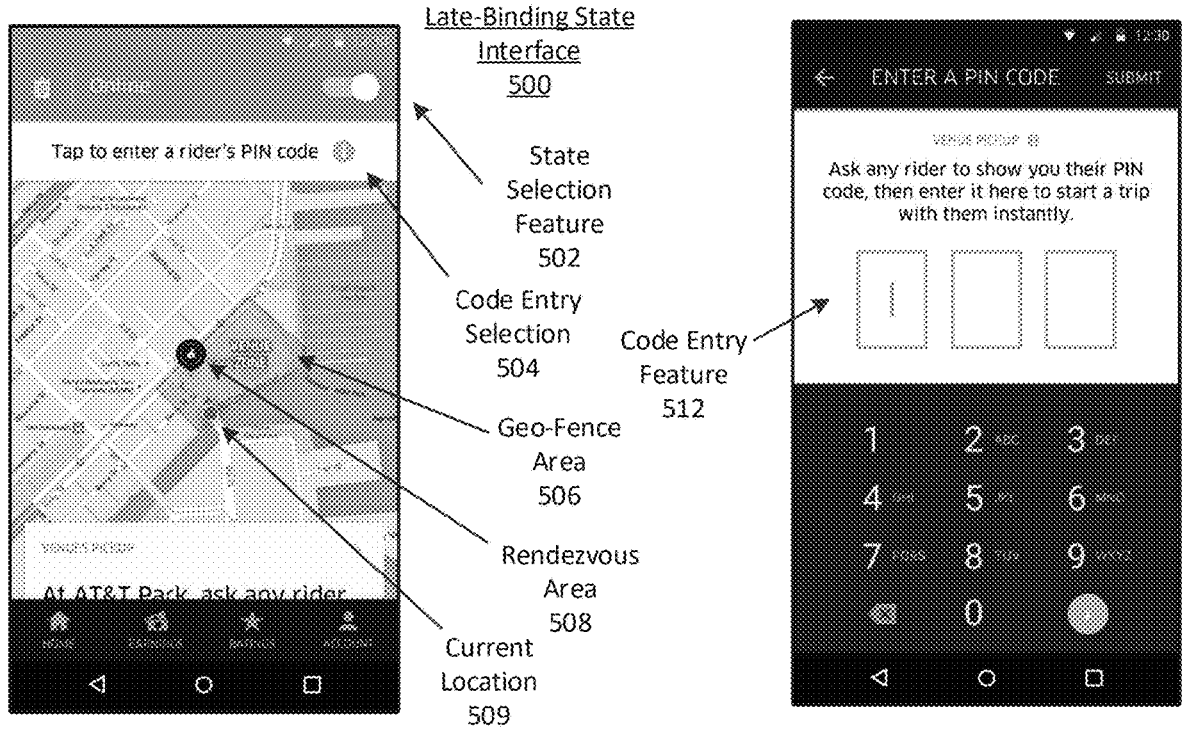
FIG. 5A
FIG. 5B
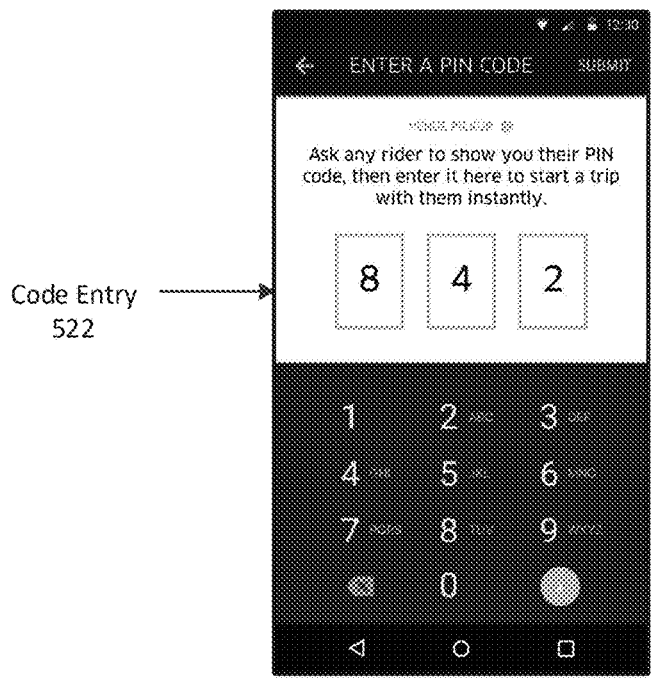
FIG. 5C

FACILITATING DIRECT RENDEZVOUS FOR A NETWORK SERVICE

CROSS-REFERENCE TO RELATED APPLICATIONS

This application is a Continuation of U.S. patent application Ser. No. 16/864,477, filed on May 1, 2020; which is a Continuation of U.S. patent application Ser. No. 16/360,858, filed on Mar. 21, 2019 (now U.S. Pat. No. 10,706,659); which is a Continuation of U.S. patent application Ser. No. 16/148,895, filed on Oct. 1, 2018 (now U.S. Pat. No. 10,304,277), which is a Continuation of U.S. patent application Ser. No. 15/350,905, filed on Nov. 14, 2016 (now U.S. Pat. No. 10,192,387), which is a Continuation of U.S. patent application Ser. No. 15/292,055, filed on Oct. 12, 2016 (now U.S. Pat. No. 10,325,442); the aforementioned applications being hereby incorporated by reference in their respective entireties.

BACKGROUND

On-demand transportation services accommodate riders in various situations where public transportation is unavailable, overcrowded, too sparse, or otherwise subjectively undesirable. For example, taxi queues are a common occurrence at mass egress locations such as concert venues, sporting stadiums and arenas, large airports, and other mass gathering locations. These locations can experience significant egress constriction when transportation infrastructure and/or taxi queues are insufficient in handling such events. This can leave patrons and users of these mass gathering locations stranded and waiting for transportation for aggravating periods of time.

BRIEF DESCRIPTION OF THE DRAWINGS

The disclosure herein is illustrated by way of example, and not by way of limitation, in the figures of the accompanying drawings in which like reference numerals refer to similar elements, and in which:

FIGS. 5A through 5E illustrate example user interfaces on a driver device, according to examples described herein;

DETAILED DESCRIPTION

Figure 1:
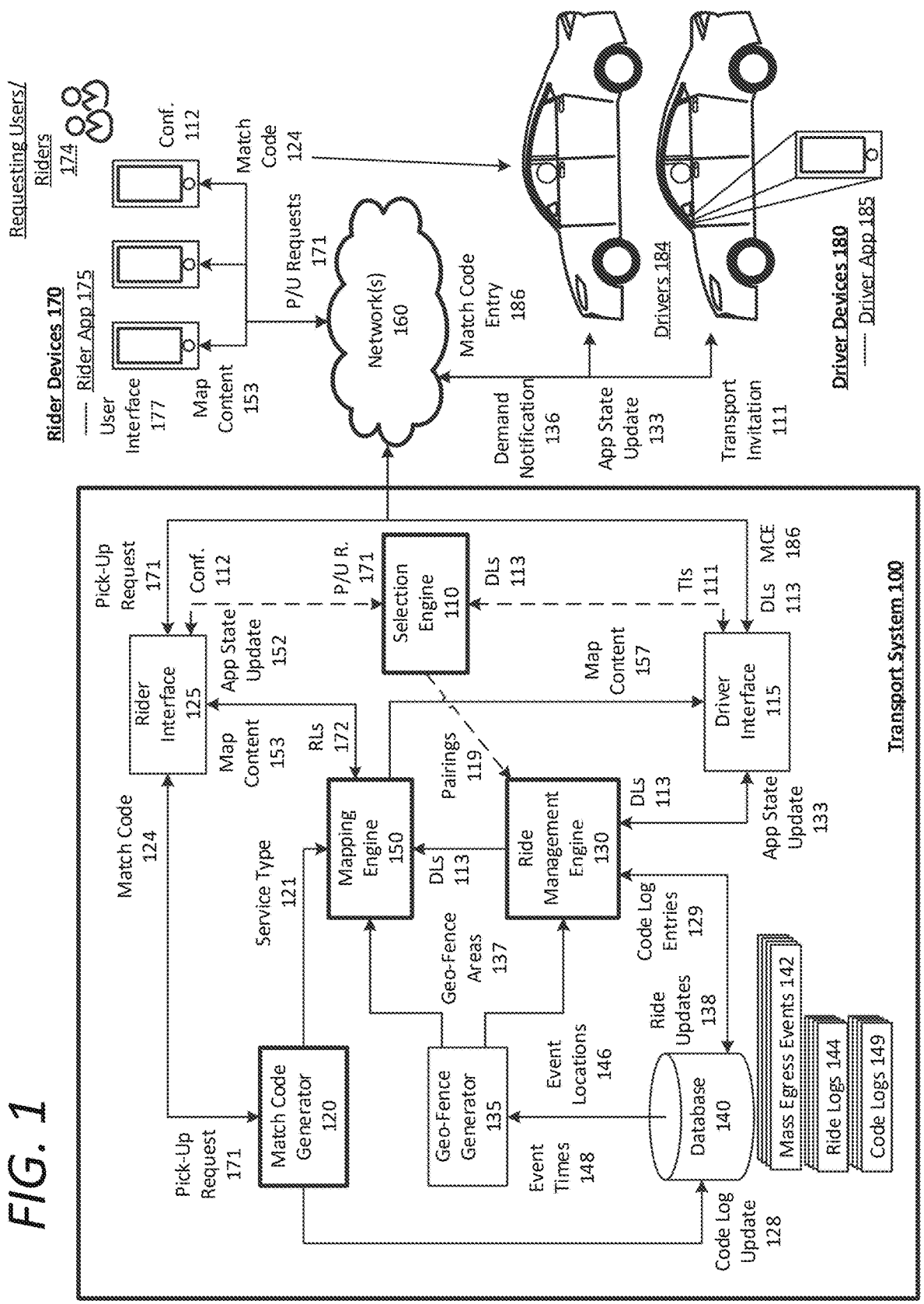
FIG. 1 is a block diagram illustrating an example transport facilitation system in communication with rider and driver devices, in accordance with examples described herein.

A transport facilitation system is described herein that manages on-demand transportation services linking available drivers and/or autonomous vehicles (AVs) with requesting riders throughout a given region (e.g., a metroplex such as the San Francisco Bay Area). In doing so, the transport facilitation system (or "transport system") can receive user requests for transportation from requesting users via a designated rider application executing on the users' computing devices. In normal or default operation/mode, the transport system can receive a pick-up request and identify a number of proximate available vehicles relative to the user. The transport system may then select an available driver to service the pick-up request based, at least in part, on a determined or inputted pick-up location by the requesting user.

However, pairing requesting users and available drivers using the default operation/mode can become complex, inefficient, or unworkable in mass egress situations (e.g., where a mass number of users wait in a small area or lot, a mass number of drivers wait in a small area or lot, etc.). For example, grouping or queuing users at a particular mass egress location can result in unorganized pairings based on non-sequential requests. A requesting user near the back of a queue may submit a pick-up request prior to a user at the front of the queue, and may be matched to an available driver ready to make pick-up. In another example, when users are matched with drivers at the egress location, the users have to find and identify the appropriate vehicle from a mass number of vehicles in a lot or area. Compounding the scenario to hundreds or thousands of requesting users and disorganized matches with available drivers creates unfortunate confusion and chaos in facilitating the mass egress.

According to examples provided herein, under certain detected conditions, the transport system can initiate a late-binding state or alternative operation for direct pairing between requesting users and available drivers at mass egress locations. In one example, the transport system can include a code generator that, upon identifying that a requesting user is within a mass egress area (e.g., within a geo-fence corresponding to the mass egress area), can provide the user with a unique match code via the executing rider application on the user's device (e.g., a three or five digit personal identifier number (PIN)). In some aspects, the unique match code can be displayed on the user's device, and can be shown to any available driver associated with the on-demand transportation service managed by the transport system. The driver application running on a driver's device can operate in a late-binding state (e.g., in response to driver input, or automatically upon identifying that the driver's location is in a geo-fence corresponding to the mass egress area or a separate nearby lot). When operating in the late-binding state, the driver device can receive an input of the unique match code inputted by the available driver, which can be transmitted to the transport system. The transport system may then log or record the rider-driver pairing (e.g., associate the user's identifier and driver's identifier in a trip record or ride log for the requested trip) in a ride management database (e.g., trip database) indicating that the requesting user has been matched with the paired driver. The driver can then be classified as being unavailable (e.g., the driver is in an "en route" state until the trip begins for the user, which then changes to "on trip" state) in a driver database. In this manner, the transport system can continue to further facilitate the mass egress.

In certain implementations, the transport system can determine location and timing information corresponding to mass egress events. Such events can correspond to a sporting event, concert, festival, or any such event in which a relatively large amount of people (e.g., a hundred, greater than one hundred, etc.) will depart from a relatively compact area within a brief timeframe. Based on this location and timing information, the transport system can establish a geo-fence around the mass egress area corresponding to the event or at an area nearby the event venue. As described herein, a geofence can be a perimeter defined by a set of points (or a circle) that corresponds to a particular geographic area. Examples described herein recognize that multiple events may occur at the same time within a particular region managed by the transport system. Accordingly, the transport system can set a geo-fence for each particular event location. The geo-fence can correspond to a state trigger on the rider and/or driver application, causing the application to initiate a late-binding state to enable direct pairing. Thus, as opposed to a pick-up request, which is received from a user device within the geo-fence, triggering the backend transport to select an available driver as in the default operation, the pick-up request can trigger the transport system to generate and transmit a unique match code for the requesting user to enable the user to pair with any available driver associated with the on-demand transportation service.

In variations, the rider application and/or driver application can include a state switching feature that enables the rider and/or driver to switch from a normal state—in which the backend transport system identifies proximate drivers and selects an optimal driver to service pick-up request—to a late-binding state in which the unique match code is provided for direct pairing. Accordingly, in certain aspects, when a would-be rider sees a number of available drivers in a waiting area (e.g., multiple driver queued in a designated airport waiting area), instead of going through a default process in which the transport system selects a driver for the rider, the rider can proactively pair with an available driver by setting the late-binding state manually.

In some examples, the transport system can facilitate in moving driver supply to a particular mass egress location. For example, prior to the mass egress event, the transport system can transmit a notification to drivers within certain proximity of the mass egress location, and optionally provide incentives to the drivers. Example incentives can include a bonus payment, an indication of a price multiplier or surge price for the mass egress location, and the like. The transport system can further designate one or more predetermined pairing location(s) in which requesting users and drivers can directly pair in the late-binding state. Along these lines, the transport system can comprise a mapping engine that configures map content to provide driving directions for drivers, and walking directions for users, to a nearest or most optimal pairing location.

Furthermore, the unique match code can be generated as a unique PIN, a quick response (QR) code, a ultrasonic signature (e.g., an ultrasonic sound pattern), an inductive pairing signature, or any other form of digital signature suitable for unique device pairing and identification. Still further, example described herein recognize that on-demand transportation service can offer multiple service types, including any combination of a ride-pooling service, a standard ride sharing service, a luxury vehicle service, a high-capacity vehicle service, a professional driver service, or a self-driving vehicle transport service. It is contemplated for certain implementations of the transport system to enable the requesting user to select a desired service type prior to submitting a pick-up request, and provide a unique match code dedicated for the selected service type, which the requesting user can utilize to pair with a particular driver offering the selected service type. To facilitate such arrangements, the transport system can, for example, allocate individual late-binding areas within the mass egress area for specified ride service types, or provide notifications including identifying information for the user of drivers that qualify for the selected service type.

In various implementations provided herein, the transport system can manage on-demand transportation services for a given area in at least two distinct simultaneous states. The first state can comprise a normal state external to mass egress locations (or corresponding geo-fenced areas defining such locations). In the normal state, the transport system can receive pick-up requests, identify candidate drivers within proximity of the requesting user, select an optimal driver to service the pick-up request, and transmit a transport invitation to the optimal driver to service the pick-up request. Thereafter, the transport system can monitor the trip progress of the user-driver pairing in transporting the user to the user's destination. The second state can comprise a late-binding state within mass egress areas (e.g., defined by geo-fences specific to mass egress events). In the late-binding state, the transport system can identify all available drivers and requesting users within the mass egress area, and facilitate direct pairing via utilization of unique match codes (e.g., unique PINs, QR codes, ultrasonic signatures, magnetic signatures, etc.).

Among other benefits, the examples described herein achieve a technical effect of improving mass egress fluidity from large-capacity locations, such as concert venues, sporting venues, and or mass-gathering areas. By facilitating direct binding between riders and drivers, the on-demand transportation service removes a major constraint to more typical organized backend pairings.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Some examples are referenced herein in context of an autonomous vehicle (AV) or self-driving vehicle (SDV). AVs or SDVs refer to vehicles that operate or can be operated in a state of automation with respect to steering, propulsion, and/or braking. Some vehicles may include human-based controls (e.g., a steering wheel, gear shifter, brake pedal, and accelerator pedal), and can be switched between a fully autonomous mode, partial autonomous mode, and/or a manual control mode. In fully autonomous mode, AVs or SDVs can operate on public roads without any human assistance utilizing a sensor suite and data processing systems to provide an awareness of the AV's or SDV's situational environment. In processing sensor data from the sensor suite—which can comprise a number of sensor systems such as LIDAR, monocular camera, stereoscopic camera, infrared proximity-based, sonar, or radar systems— the AV or SDV can operate its control mechanisms to safely control and maneuver through various road and traffic infrastructures typical of both urban and rural transportation environments.

System Description

FIG. 1 is a block diagram illustrating an example transport system in communication with user and driver devices, in accordance with examples described herein. The transport system 100 can manage a transportation arrangement service that connects requesting users or riders 174 with drivers 184 that are available to service the users' 174 pick-up requests 171. The transportation arrangement service can provide a platform that enables ride sharing services between requesting users 174 and available drivers 184 by way of a rider application 175 executing on the rider devices 170, and a driver application 185 executing on the driver devices 180. As used herein, a rider device 170 and a driver device 180 can comprise computing devices with functionality to execute a designated application corresponding to the on-demand transportation arrangement service managed by the transport system 100. In many examples, the rider device 170 and the driver device 180 can comprise mobile computing devices, such as smartphones, tablet computers, VR or AR headsets, on-board computing systems of vehicles, personal computers, laptops, wearable computing devices, and the like. Example transportation arrangement services implementing a ride sharing platform include those provided by UBER Technologies, Inc. of San Francisco, Calif.

The transport system 100 can include a rider interface 125 to communicate with rider devices 170 over one or more networks 160 via the rider application 175. According to examples, a requesting user 174 wishing to utilize the transportation arrangement service can launch the rider application 175 and transmit a pick-up request 171 over the network 160 to the transport system 100. In certain implementations, the requesting rider 174 can view multiple different service types managed by the transport system 100, such as ride-pooling, a standard ride share service type, a luxury vehicle service type, a high-capacity van or large vehicle service type, a professional driver service (e.g., where the driver is certified), a self-driving vehicle transport service, other specialized ride services, and the like. In some examples, the transport system 100 can utilize the driver locations 113 to provide the rider devices 170 with estimate time of arrival (ETA) data of proximate drivers for each respective service type. For example, the rider application 175 can enable the user 174 to view information corresponding to each service type, and provide map content 153 indicating visual representations of available drivers proximate to the user's current location 172.

In a normal operating state, the requesting user 174 can utilize the user interface 177 of the rider application 175 to configure and transmit a pick-up request 171 to the transport system 100. In this state, the pick-up request 171 can be processed by a selection engine 110 of the transport system 100. In various examples, the selection engine 110 can receive data indicating driver locations 113 of the drivers 184 operating throughout the given region. For example, the selection engine 110 can access the location-based resources (e.g., GPS module) of driver devices 180 via the driver application 185 to determine the driver locations, or receive a periodic location ping from the driver devices 180 indicating their current locations 113. The selection engine 110 can process the pick-up request 171 to identify a pick-up location inputted by the requesting user 174, or can determine a pick-up location based on the requesting user's current location 172 (e.g., via location-based resources of the rider devices 170).

Accordingly, in the normal state, the selection engine 110 can identify a plurality of candidate drivers within a certain proximity of the requesting user's current location 172, and select an optimal driver from the candidate set to service the pick-up request 171. The optimal driver may be a driver that is closest to the requesting user 174 or pick-up location in terms of distance and/or time, or may be more optimal for other reasons (e.g., value-based calculations, location driver supply conditions, etc.). The selection engine 110 can then generate and transmit a transport invitation 111 to the optimal driver, which the driver can either accept or decline. Upon accepting the transport invitation 111, the selection engine can generate and transmit a confirmation 112 to the rider device 170 of the requesting user 174 indicating that the optimal driver is en route to the pick-up location. In various implementations, the selection engine 110 may then transmit data indicating the pairing 119 to a ride management engine 130, which can log a ride update 138 in a set of ride logs 144 to indicate that the requesting user 174 and the optimal driver are currently on trip to the destination.

While such a selection system ensures an exceptional level of robustness in typical driver supply and rider demand conditions, complications quickly arise when the combination of localization and time compression of rider demand increases above a certain threshold (e.g., on the order of hundreds of pick-up requests 171 from a single block area within a few minutes). In such scenarios, the robustness of the transport system's normal state (utilizing the selection engine 110) can rapidly diminish, and can even contribute to the chaos amongst requesting users 174 and drivers 184. For example, the selection engine 110 may operate on a first-request-first-pairing basis in which pick-up requests 171 are treated as a queue and limited by the granularity of location resources (e.g., GPS). Accordingly, when large groups of requesting users 174 are simultaneously submitting pick-up requests 171, the transport system 100 may be unable to discern which particular users 174 are at the front of a queue. The same may go for large groups of drivers 184 within a confined space (e.g., a pick-up area or parking lot).

According to examples described herein, the transport system 100 can include a geo-fence generator 135 and a database 140 to store data indicating the locations 146 and times 148 of mass egress events 142. The mass egress event data 142 can further indicate a projected ride demand for the event, which can indicate an estimated number of ride requests from the event. In one aspect, the transport system 100 can receive the mass egress event data 142 via human input. Additionally or alternatively, the transport system 100 can link with event resources for the given region, such as sporting calendars and venue schedules for mass gathering events. In certain implementations, the transport system 100 can compile historical data indicating when such scheduled events may occur, or can identify impromptu events based on any number of factors (e.g., a holiday schedule, trendy locations, tourism data, weather data, protest triggers, real-time news data, etc.).

Utilizing the mass egress event data 142, the geo-fence generator 135 can determine or otherwise estimate timing information for a particular mass egress event, and set a geo-fence area 137 encompassing the event location or area corresponding to the mass egress event at a predetermined time prior to the mass egress. According to examples provided herein, the geo-fence area 137 can inform the ride management engine 130 and a mapping engine 150 of the transport system 100 that any requesting user 174 or available driver 184 within the geo-fence area 137 is to be treated in accordance with a late-binding state to enable direct pairing.

In some aspects, upon or during execution of the rider application 175 on a rider device 170, the mapping engine 150 can identify the rider location 172 as being within a geo-fence area 137, and generate an app state update 152 to cause the rider application 175 to initiate a late-binding state. Likewise, an available driver 184 may operate throughout the given region and can cross into the geo-fence area 137, which can trigger the mapping engine 150 to generate an app state update 133 for the driver application 185. This app state update 133 can also cause the driver application 185 to initiate the late-binding state. In certain implementations, initiation of the late-binding state on the rider and driver applications 175, 185 can cause the mapping engine 150 to generate and provide map content 153, 157 indicating a pick-up area for the mass egress event.

Example described herein recognize that the term "geo-fence" may be used for a variety of purposes throughout various technologies and industries. As used herein, a "geo-fence area 137" corresponds to an area encompassing a mass egress location or venue. Thus, requesting users 174 and available drivers 184 within a geo-fence area 137, as described herein, are provided with a respective app state update 152, 133 triggered by the transport system 100 identifying their respective locations within the geo-fence area 137. As provided herein, the app state update 152, 133 can cause the rider application 175 and driver application 185 to enable a direct pairing experience, and bypass the normal selection-pairing process performed by the selection engine 110 of the transport system 100.

Furthermore, in certain implementations, the rider waiting area can comprise one geo-fence and the driver waiting area can comprise a second geo-fence. Accordingly, when the transport system 100 detects the rider 174 and the driver 184 in their respective geo-fence areas, the transport system 100 can transmit the app state updates 133, 153 to cause each of the rider device 170 and the driver device 180 to execute the late-binding state. In further variations, the rider application 175 can include a selectable state feature that enables the ride 174 to select the late-binding state in order to receive a match code 124 and present the match code 124 to any available driver 184 (e.g., in a predetermined waiting area).

The map content 153 for display on the user interface 177 of the rider application 175 can provide walking directions or a straight line indicator from either the user's current location 172 within the geo-fence area 137, or a general central location of the mass egress venue, to the designated pick-up area. Likewise, the map content 157 for display on the driver device 180 via the driver application 185 can provide driving directions to the pick-up area, or an indication of the relative location of the pick-up area in relation to a map of the mass egress venue.

As described herein, the transport system 100 can facilitate any number of ride service types, such as a carpooling service type, a regular ride-sharing service type, a professional ride service type (e.g., a qualified professional driver), a large-capacity vehicle service type (e.g., for more than three passengers), a luxurious ride service type, a black car service type, and the like. Accordingly, the transport system 100 may divide a particular pick-up area within the geofence area 137 based on service type, or when applicable, may provide different locations within the geo-fence area 137 for each service type, or cluster service types together in multiple pick-up areas. For example, a luxury ride service, black car service, and professional driver service may be grouped together in a separate pick-up area. Furthermore, the transport system 100 can store driver profiles (not shown) indicating the service types for which each of the available drivers 184 are qualified. Thus, the map content 157 provided to the drivers 184 can indicate directions to the specified pick-up area for the particular service type of the driver 184.

In certain examples, the map content 153 provided to the rider device 170 can be triggered by receiving a pick-up request 171 from the rider device 170. The pick-up request 171 can be received by the rider interface 125 while the rider device 170 is in the late-binding state, and the rider interface 125 can submit the pick-up request 171 to a match code generator 120 of the transport system 100. The match code generator 120 can then generate a unique match code 124 (e.g., a three to five digit PIN), and transmit the unique match code 124 to the rider device 170. In some aspects, the pick-up request 171 can further indicate a desired ride service type 121. The match code generator 120 can provide data indicating the desired ride service type 121 to the mapping engine 150, which can generate and provide updated map content 153—indicating walking directions to the pick-up area specific to the desired ride service type 121—to the rider device 170.

In some situations, high network latency may prevent ideal operation of the rider application 175 and the driver application 185. Examples provided herein can utilize text messaging services to provide the match code 124 to the rider device 170, as opposed to provide the match code 124 directly through the rider application 175. For example, the transport system 100 may receive the pick-up request 171 as a text message from a rider device 170. The text message can include a unique identifier indicating the requesting user 174, and a request for a ride from within a mass egress area. The match code generator 120 can respond to the request text message by generating a response text message that includes the match code 124 for transmission to the rider device 170 via a text messaging application. Thereafter, the requesting user 174 can provide the match code 124 to an available driver 184. As provided herein, the transport system 100 may also receive the match code entry 186 via text message from the driver device 180, and correlate the rider 174 and driver 184 in the ride logs 144 accordingly.

The database 140 can store code logs 149 that enable the match code generator 120 to maintain an updated account of unique match codes 124 generated, and the state of those codes 124 to provide robustness and organization for the ride management engine 130. According to various examples, pick-up requests 171 received by the match code generator 120 can include a unique identifier of the requesting user 174, which the match code generator 120 can utilize to correlate with the unique match code 124 provided to that requesting user 174. The match code generator 120 may then log the correlation as a code log update 128 in the code logs 149, indicating that the requesting user 174 has been provided with the unique match code 124.

Upon receiving the unique match code 124, the requesting user 174 can view the match code 124 or otherwise receive an indication that the match code 124 has been received. The requesting user 174 may then present or otherwise transmit the match code 124 to any available driver 184. For unique PIN implementations, the available driver 184 can view the unique PIN on a display the rider device 170 and perform a manual match code entry 186 on an entry screen displayed on the driver device 180. The match code entry 186 may then be submitted to the transport system 100 to indicate that the pairing has been made. However, examples described herein are not limited to manual match code entries 186 of unique match codes 124 by the driver 184. The match code generator 120 can provide any type of unique digital signature to the rider device 170 upon receiving the request 171, which the requesting user 174 can provide to the driver 184 or driver device 180 in a variety of manners. Example unique match codes 124 generated by the match code generator 120 can include unique PINs, QR codes, ultrasonic signatures, magnetic signatures, and the like.

For QR code implementations, the QR code can be displayed on the rider device 170 and presented to the driver 184. The driver 184 may then utilize an image capturing resource of the driver device 180 to scan or otherwise capture the QR code to complete the pairing. For ultrasonic implementations, upon meeting an available driver 184, the rider can cause the speaker or other output device of the rider device 170 to output the ultrasonic signature (e.g., via a selectable feature on the user interface 177), which can be detected by a microphone of the driver device 180 to complete the pairing. Alternatively, the rider device 170 can output the ultrasonic signature in response to (i) receiving a signal from the transport system, (ii) receiving an input from the rider to make a pick-up request when the rider is within the mass egress area, or (iii) detecting that the rider device 170 has entered the mass egress area. In further variations, once the rider 174 and driver 184 meet within the mass egress area, the rider 174 and driver 184 can respectively perform an ultrasonic handshake in which the rider 174 causes the rider device 170 to output the ultrasonic signature (e.g., via an input on a selectable feature of the rider application 175), and the driver 184 causes the driver device 180 to "listen" for the signature (e.g., via an input on a selectable feature of the driver application 185). For magnetic or inductive signatures, the rider device 170 may be placed in inductive contact with the driver device 180 to complete the pairing. Thus, as shown in FIG. 1, the match code entry 186 can comprise a manual entry of a unique PIN, or data indicating that the driver device 180 has received the unique match code 124 in the designated form provided herein.

As described herein, the ride management engine 130 can maintain organization of ride states of the users 174 and drivers 184 in ride logs 144 (e.g., ride request state for riders 174, on trip state for both riders 174 and drivers 184, driver available state for drivers 184). Upon receiving the match code entry 186 via the driver interface 115, the ride management engine 130 can perform a lookup in the code logs 149 to identify the appropriate code log entry 129 indicating the correlation between the unique match code 124 corresponding to the match code entry 186, and the requesting user 174 associated with the match code 124.

The match code entry 186 can include a unique identifier of the paired driver 184, which the ride management engine 130 can utilize to log a ride update 138 indicating the pairing between the requesting user 174 and the paired driver 184. Thus, instead of receiving the pairing data 119 from the selection engine 110, in the late-binding state, the ride management engine 130 can cross-reference the code log entry 129 (including the unique identifier of the requesting user 174 and the unique match code 124 provided) with the match code entry 186 by the driver 184. The ride management engine 130 may then log a ride update 138 indicating the pairing between the requesting user 174 and the available driver 184 in the ride logs 144, and provide an app state update 152, 133 to both the rider device 170 and the driver device 180 indicating an on-trip status of both the requesting user 174 and the paired driver 184. This on-trip status can persist until the trip terminates at the destination of the requesting user 174. Accordingly, an "en route" state—in which the driver 184 travels to a pick-up location to rendezvous with the user—is bypassed.

In certain scenarios, driver supply at mass egress events may be limited, so moving supply towards the event location 146 prior to the mass egress event (e.g., the end of a concert or sporting event) may provide relief to such supply constrained scenarios. Accordingly to examples provided herein, the ride management engine 130 can facilitate in proactively moving driver supply to a given geo-fence area 137 by utilizing the driver locations 113 of the drivers 184 operating throughout the given region. The ride management engine 130 can further identify the event time 148 and location 146 corresponding to a given mass egress event to generate a demand notification 136 for the drivers 184. In one aspect, the transport system 100 can transmit the demand notification 136 to the drivers 184 within a predetermined time prior to the estimate time of the mass egress event (e.g., one hour prior to the estimated end time of a concert). The demand notification 136 can indicate the event, the estimated time of the mass egress, and the event location 146. In further implementations, the transport system 100 can include incentives in the demand notification 136 to attract available drivers 184 to the event location 146 to ensure adequate driver supply.

Rider Device

Figure 2:
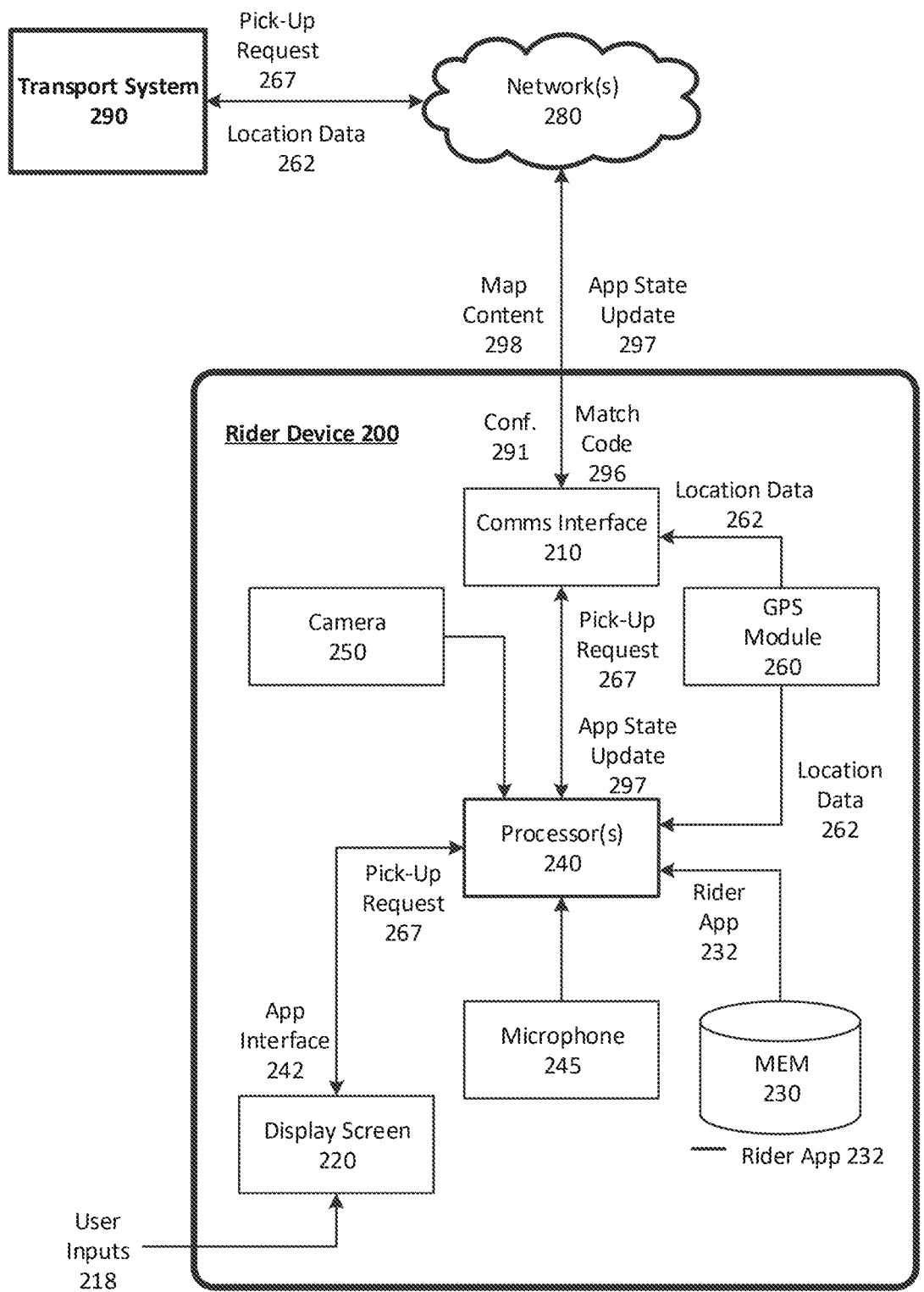
FIG. 2 is a block diagram illustrating an example rider device executing a designated rider application for a transport arrangement service, as described herein.

FIG. 2 is a block diagram illustrating an example rider device executing a designated rider application for a transport arrangement service, as described herein. In many implementations, the rider device 200 can comprise a mobile computing device, such as a smartphone, tablet computer, laptop computer, VR or AR headset device, and the like. As such, the rider device 200 can include typical telephony features such as a microphone 245, a camera 250, and a communication interface 210 to communicate with external entities using any type of wireless communication protocol. In certain aspects, the rider device 200 can store a designated application (e.g., a rider app 232) in a local memory 230.

In response to a user input 218, the rider app 232 can be executed by one or more processors 240, which can cause an app interface 242 to be generated on a display screen 220 of the rider device 200. The app interface 242 can enable the user to, for example, check current price levels and availability for various ride service types of the on-demand transportation arrangement service. In various implementations, the app interface 242 can further enable the user to view information corresponding to the multiple ride service types, and select from the multiple ride service types, such as a carpooling service type, a regular ride-sharing service type, a professional ride service type, a van transport service type, a luxurious ride service type, and the like. Example services that may be browsed and requested can comprise those services provided by UBER Technologies, Inc. of San Francisco, Calif.

The user can generate a pick-up request 267 via user inputs 218 provided on the app interface 242. According to examples described herein, the user can provide user inputs 218 on the app interface 242, which can be processed by the processor(s) 240 and/or the transport facilitation system 290 over the network(s) 280 to provide content updates 244, as described herein. In doing so, the rider application 232 can enable a communication link with a transport system 290 over the network 280, such as the transport system 100 as shown and described with respect to FIG. 1. In a normal state, to request transportation, the user can input a destination and/or pick-up location, select a ride service type, and submit a pick-up request 267 to the transport system 290.

In a normal state, once the ride service type is selected and the user wishes to request a ride, the processor(s) 240 can transmit the pick-up request 267 via the communications interface 210 to the backend transport facilitation system 290 over a network 280. In response, the rider device 200 can receive a confirmation 269 from the transport facilitation system 290 indicating the selected driver and vehicle that will service the pick-up request 267 and rendezvous with the user at the pick-up location. In various examples, the rider device 200 can further include a GPS module 260, which can provide location data 262 indicating the current location of the requesting user to the transport system 290 to, for example, establish the pick-up location and/or select an optimal driver or autonomous vehicle to service the pick-up request 267.

According to examples, execution of the rider app 232 can cause the rider device 200 to transmit location data 262 to the transport system 290. (e.g., via a GPS module 260 of the rider device 200). As described herein, the transport system 290 can utilize the location data 262 to determine whether the user is within a geo-fenced area corresponding to a mass egress event. If the rider device 200 is within the geo-fenced area, the transport system 290 can transmit an app state update 297 to the rider device 200, which can cause the rider application 232 to initiate a late-binding state. In the late binding state, the app interface 242 can update the manner in which the user interacts with the transport service. In particular, a pick-up request 267 transmitted by the rider device 200 in the late-binding state can cause the transport system 290 to transmit a match code 296 to the rider device 200. Thus, the requesting user can be instructed to present or otherwise transmit the match code 296 to an available driver directly, to perform the direct pairing.

Driver Device

Figure 3:
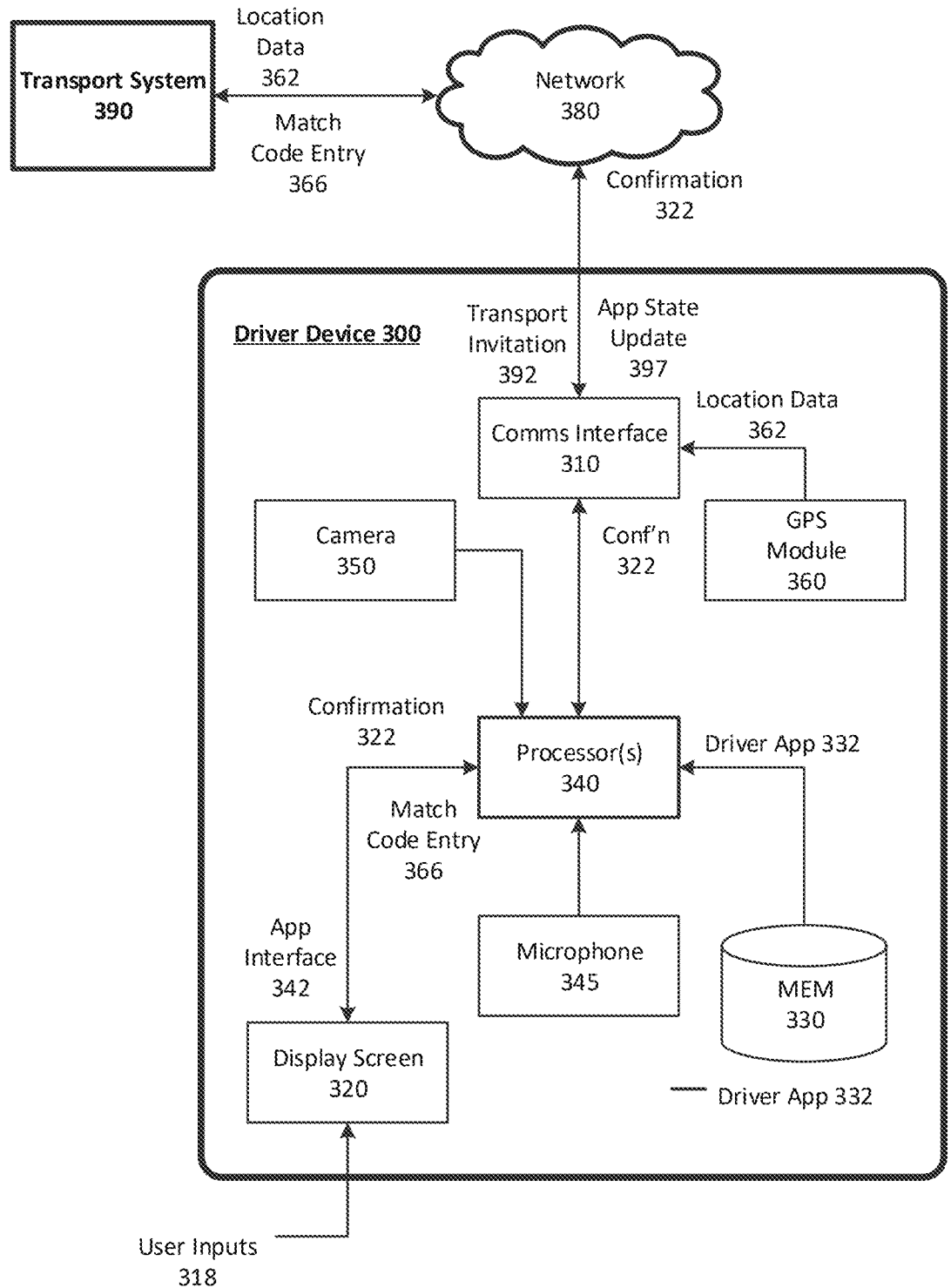
FIG. 3 is a block diagram illustrating an example driver device executing a designated driver application for a transport arrangement service, as described herein.

FIG. 3 is a block diagram illustrating an example driver device executing a designated driver application for a transport arrangement service, as described herein. In many implementations, the driver device 300 can comprise a mobile computing device, such as a smartphone, tablet computer, laptop computer, VR or AR headset device, and the like. As such, the driver device 300 can include typical telephony features such as a microphone 345, a camera 350, and a communication interface 310 to communicate with external entities using any type of wireless communication protocol. In certain aspects, the driver device 300 can store a designated application (e.g., a driver app 332) in a local memory 330.

In response to a user input 318, the driver app 332 can be executed by one or more processors 340, which can cause an app interface 342 to be generated on a display screen 320 of the driver device 300. The app interface 342 can enable the driver to initiate an "on-call" or "available" sub-state (of the normal application state), linking the driver device 300 to the backend transport system 390 that facilitates the on-demand transportation services. Execution of the driver application 332 can also cause a location resource (e.g., GPS module 360) to transmit location data 362 to the transport system 390 to indicate the current location of the driver with the given region.

In the normal state, the driver can receive transport invitations 392 from the transport system 390, where the transport invitations 392 indicate a particular pick-up location to service a pick-up request. The driver can provide confirmations 322 back the transport system 390 indicating that the driver will service the pick-up requests, or, in some aspects, decline the transport invitation 392 and await a subsequent opportunity. Upon submitting a confirmation 322, the driver application 332 can place the driver device 300 in an en route sub-state while the driver drives to the pick-up location to rendezvous with the requesting user. Thereafter, the driver application 332 can initiate an on-trip sub-state (e.g., provide map directions to the requester's destination) while the driver transports the requesting user to the destination.

According to examples described herein, when the location data 362 indicates that the driver has entered a geo-fence area, the transport system 390 can transmit an app state update 397 to initiate a late-binding state on the driver device 300. In the late-binding state, the driver can await a rider, who can present the unique match code to the driver for entry (or can otherwise transmit the unique match code to the driver device 300). In various implementations, the driver can perform a match code entry 366 on the app interface 342, and submit the match code entry 366 to the transport system 390. Submission of the match code entry 366 can cause the driver application 332 to automatically initiate an on-trip sub-state, indicating that the driver has been paired with a rider. In certain implementations, the on-trip sub-state can cause map content to the generated on the application interface 342, providing driving directions to the rider's destination.

User Interface Examples

Figure 4A:
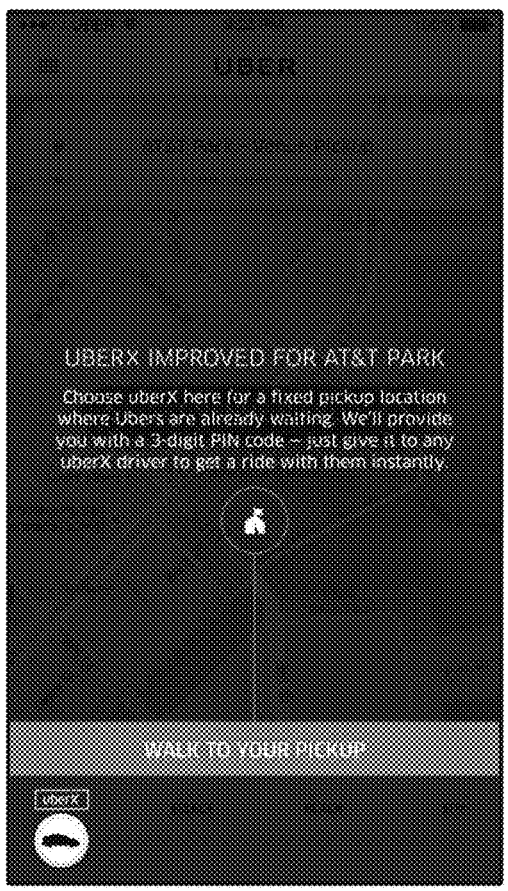
FIGS. 4A through 4D illustrate example user interfaces on a rider device, according to examples described herein.

FIGS. 4A through 4D illustrate example user interfaces on a rider device, according to examples described herein. In the below description of FIGS. 4A through 4D, reference may be made to reference characters representing like features as shown and described with respect to FIGS. 1 and 2. Referring to FIG. 4A, when the rider is within a geo-fence area, execution of the rider application 232 on the rider device 200 can cause a rider app interface 400 to be generated on the display screen 220. The rider app interface 400 can include a late-binding state notification 402 indicating the direct pairing process to request a rider.

Figure 4B:
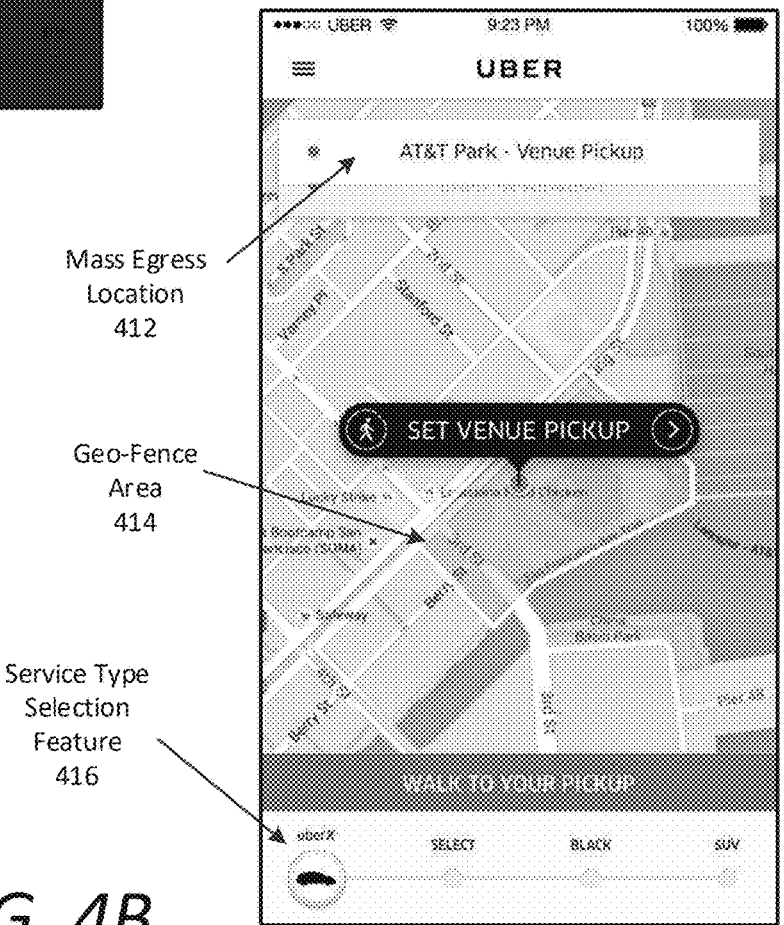
Figure 4C:
Figure 4D:
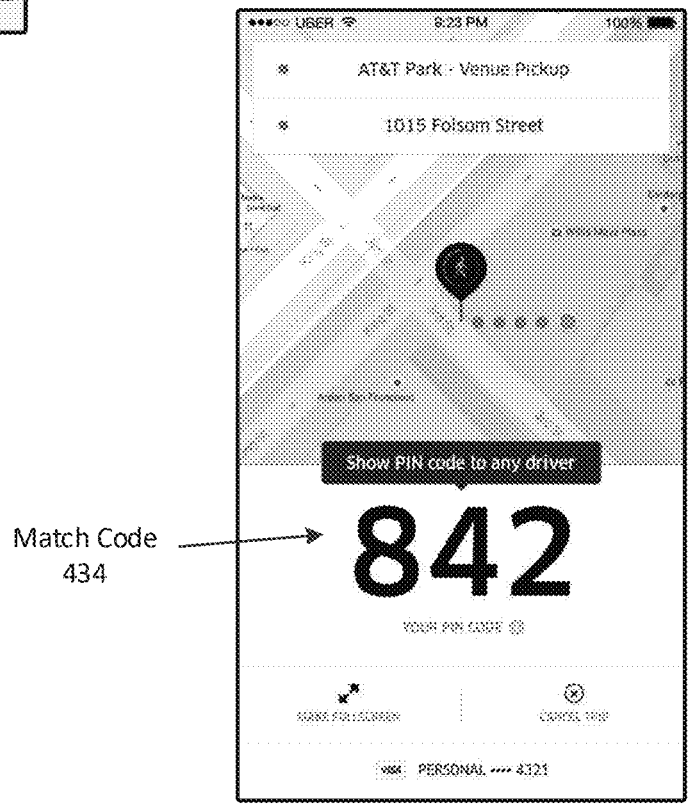

Referring to FIG. 4B, the app interface 400 can show the mass egress location 412 at which the user is located, and a geo-fence area 414 corresponding to the late-binding state on the rider application. The rider app interface 400 can further include a service type selection feature 416 enabling the user to select from any number of listed service types. Referring to FIG. 4C, the rider app interface 400 can further include a destination input feature 424 that enables the user to input a desired destination. The interface 400 can further include walking directions 426 or a straight line indicator directing the user to the pick-up area to pair with a driver. In many aspects, upon entry of the destination 424, the rider app interface 400 can display a ride price 428, which can comprise an estimated or upfront guaranteed price to transport the user to the destination 424. If the user is satisfied with the ride price 428, the user can select a request feature 429 on the interface. Referring to FIG. 4D, selection of the request feature 429 can cause the backend transport system 290 to generate and transmit a match code 434 to the rider device 200 for display on the app interface 400. The rider can present this match code 434 to any available driver at the rendezvous location to initiate the ride to the destination 424.

Figure 5D:
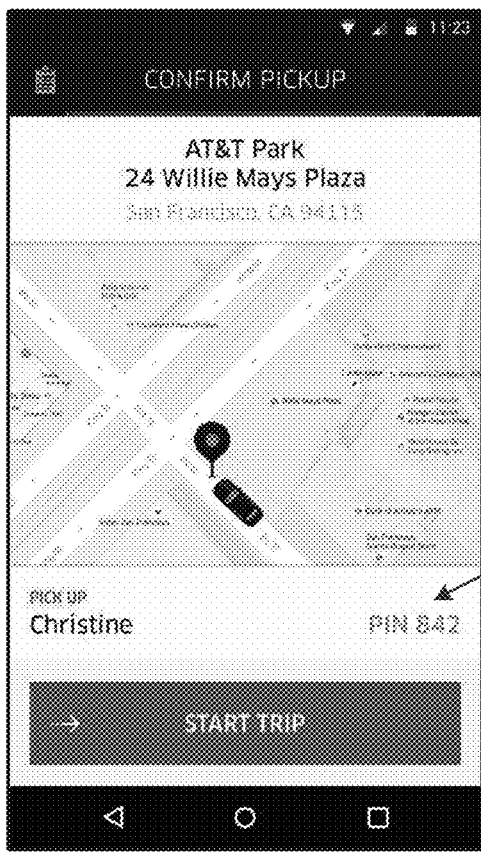

FIGS. 5A through 5E illustrate example user interfaces on a driver device, according to examples described herein. In the below discussion of FIGS. 5A through 5E, reference may be made to reference characters representing like features as shown and described with respect to FIGS. 1 and 3. Referring to FIG. 5A, upon crossing into a geo-fence area 506, the driver device 300 can display a late-binding state interface 500. In variations, the interface 500 can include a state selection feature 502 enabling the driver to switch between the late-binding state and the normal state, as described herein. The late-binding state interface 500 can display map content indicating the geo-fence area 506 corresponding to a mass egress event, a rendezvous area 508 where the driver can await a requesting user, and a current location of the driver 509. When a requesting user approaches with a match code, the driver can select a code entry selection feature 504, which can trigger a code entry feature 512, as shown in FIG. 5B. the code entry feature 512 enables the driver to perform a code entry 522 of the match code displayed on the rider device, as shown in FIG. 5C.

Figure 5E:
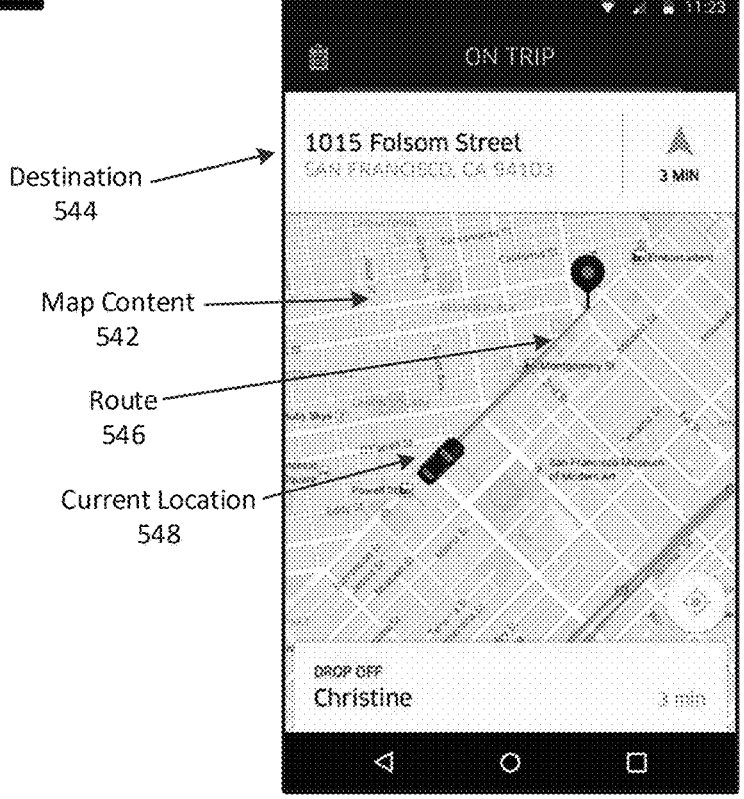

Referring to FIG. 5D, upon entering the match code, the state interface 500 can display a trip initiation screen that provides a code confirmation 534 and a trip start feature 532 that triggers an on-trip status for both the rider and the driver. Upon selection of the trips start feature 532, the state interface 500 can display an on-trip screen indicating the destination 544, and map content 542 which can include a route 546 to the destination 544 and the current location of the driver 548, as shown in FIG. 5E. Upon dropping of the rider, the driver device 300 can update the driver's status accordingly.

Methodology

Figure 6:
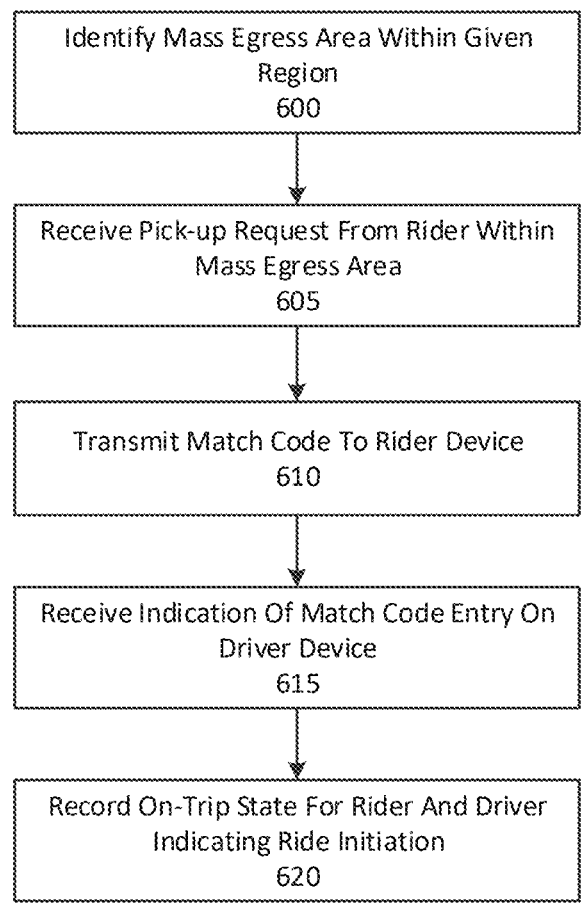
FIG. 6 is a flow chart describing an example method of providing direct binding between riders and driver in connection with an on-demand transportation service, as described herein.

FIG. 6 is a flow chart describing an example method of providing direct binding between riders and driver in connection with an on-demand transportation service, as described herein. In the below discussions of FIG. 6, reference may be made to reference characters representing like features as shown and described with respect to FIG. 1. Furthermore, the process described with respect to FIG. 6 below may be performed by an example transport system 100, 290, 390 as shown and described in connection with FIGS. 1 through 3. Referring to FIG. 6, the transport system 100 can identify a mass egress area or event 142 within a given region in which the transport system 100 manages on-demand transportation services (600). The transport system 100 may receive a pick-up request 171 from within the mass egress area from a rider device 170 (605). In response to receiving the pick-up request 171, the transport system 100 can transmit a match code 124 to the rider device to enable the rider 174 to directly pair with an available driver 184 (610).

Thereafter, the transport system 100 can receive an indication of a match code entry 186 of the match code 124 from a driver device (615). As described herein, the match code entry 186 can indicate that the rider 174 has shown or otherwise provided the match code 124 to the driver 184. Based on the pairing, the transport system 100 can record an on-trip state for both the rider 174 and the driver 184 to indicate that the pairing has been made and a trip has initiated (620). By recording the status change, the transport system 100 can continue to manage its user base in facilitating the mass egress from the mass egress venue.

Figure 7:
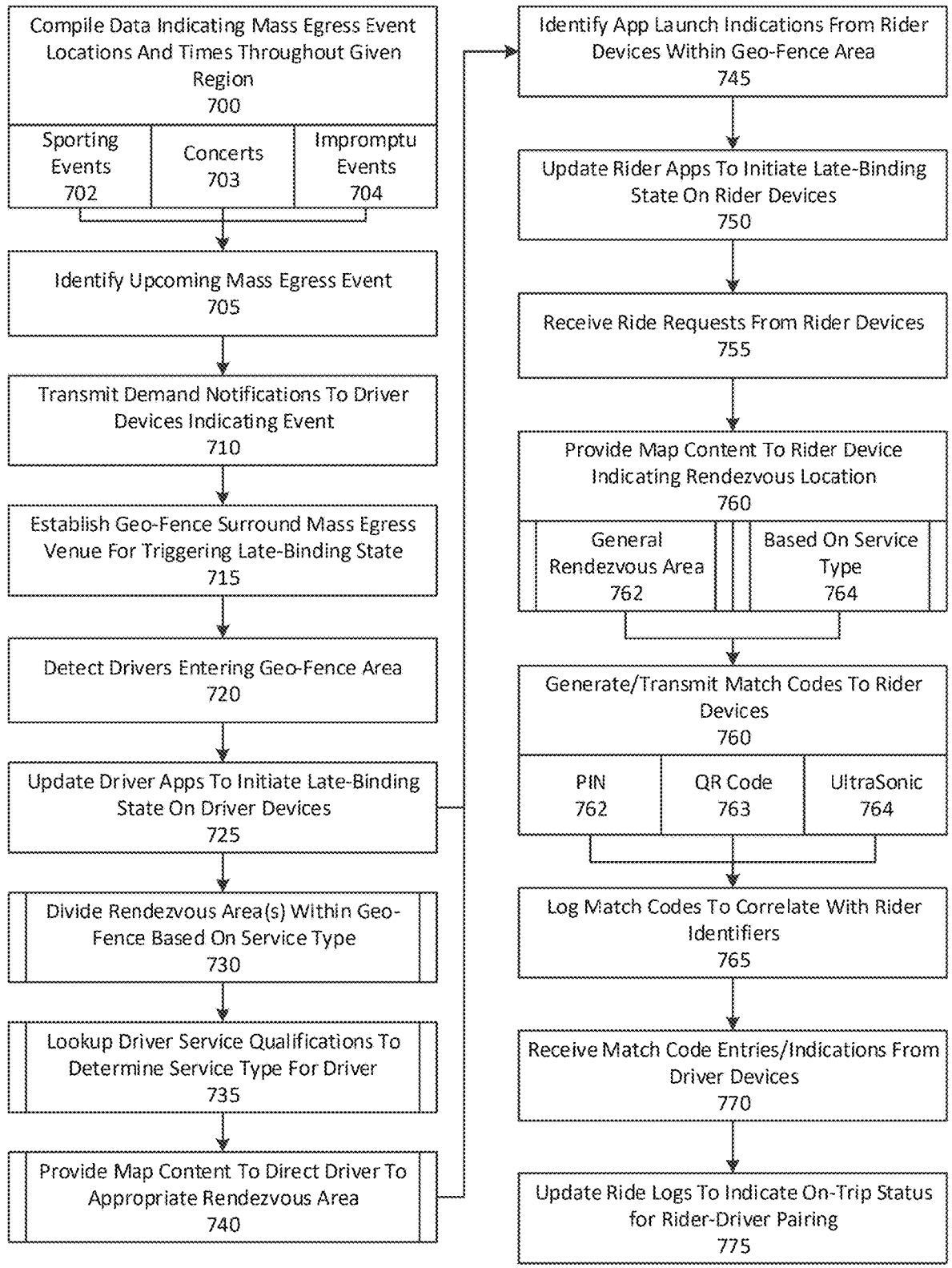
FIG. 7 is a flow chart describing another example method of providing direct binding between riders and driver in connection with an on-demand transportation service, as described herein.

FIG. 7 is a flow chart describing another example method of providing direct binding between riders and driver in connection with an on-demand transportation service, as described herein. In the below discussions of FIG. 7, reference may be made to reference characters representing like features as shown and described with respect to FIG. 1. Furthermore, the process described with respect to FIG. 7 below may be performed by an example transport system 100, 290, 390 as shown and described in connection with FIGS. 1 through 3. Referring to FIG. 7, the transport system 100 can compile data indicating mass egress events 142, such the event locations 146 and times 148, throughout a given region in which the transport system 100 manages on-demand transportation services (700). Such mass egress events can include, for example, sporting events (702), concerts (703), and impromptu events (704). In some aspects, the impromptu events can be determined by the transport system 100 by combing current alerts, notifications, and news sources for the given region. Such sources can indicate ride demand spikes at specified locations, such as a local airport, train station, or bus station (e.g., during weather delays or other anomalous scenarios), protest or parade locations, and the like.

According to examples, the transport system 100 can identify an upcoming mass egress event at a particular venue or location (e.g., a sporting stadium, concert venue, etc.) (705). In addition to identifying the mass egress event, the transport system 100 can determine whether driver supply in proximity of the event is sufficient to handle a projected ride demand from the event. In various examples, the transport system 10 can transmit demand notifications 136 to drivers 184 operating within a certain proximity of the event location (710). In addition, the demand notifications 136 can include incentives to attract driver supply to the event location 146, such as a bonus payment, or surge pricing factor indication.

In various implementations, the transport system 100 can establish a geo-fence to encompass or surround the mass egress location or venue for trigger late-binding states on rider and driver devices 170, 180 (715). Accordingly, the transport system 100 can receive driver locations 113 and detect when drivers 184 enter the geo-fence area 137 (720). In response to detecting a driver 184 entering the geo-fence area 137, the transport system can update the driver application 185 to initiate a late-binding state on the driver device 180 to enable direct pairing with a rider 174 (725).

In some aspects, the transport system 100 can further one or more divide rendezvous areas within the geo-fence area 137 based on ride service type (730), as described herein. Thus, the transport system 100 can perform a lookup in a profile of the driver 184 to determine the service type(s) for which the driver 184 is qualified (735), and provide map content 157 to the driver device 180 to direct the driver 184 to the appropriate rendezvous area based on the service type (740).

The transport system 100 may also identify rider application 175 launch indications from rider devices 170 within the geo-fence area 137 (745). In response to these indications, the transport system 100 can update the rider application 175 to initiate a late-binding state on the rider devices 170 (750). Thereafter, the transport system 100 can receive ride requests 171 from rider devices 170 within the geo-fence area 137 (755). In certain aspects, the transport system 100 can provide map content 153 to the rider devices 170 indicating the rendezvous location or area at which the rider 174 will meet the available drivers 184 (760). As provided herein, the map content 153 can indicate a general rendezvous area for direct pairing (762) or a specified rendezvous location based on a selected service type by the rider 174 (764).

In response to receive a ride request 171, the transport system 100 can generate and transmit a match code 124 to the rider device 170 (760). The match code 124 can comprise a PIN (762), a QR code (763), an ultrasonic code (764), or any other suitable digital signature. The transport system 100 may then log the match code 124 in a code log 149 to correlate the match code 124 with an identifier of the requesting user 174 (765). The transport system can receive a match code entry 186 corresponding to a driver 184 entering or otherwise receiving the match code 124 on the driver device 180 (770). As discussed, this match code entry 186 can indicate that the rider 174 has paired with a driver 184. Upon receiving the match code entry 186, the transport system 100 can update a ride log 144 to indicate an on-trip status for both the rider 174 and the driver 184 (775). Thus, examples provided herein can remove the rider 174 and driver 184 from the mass egress pool, provide organization for the transport system 100 to facilitate the mass egress, and improve the flow of people away from mass gatherings.

Hardware Diagram

Figure 8:
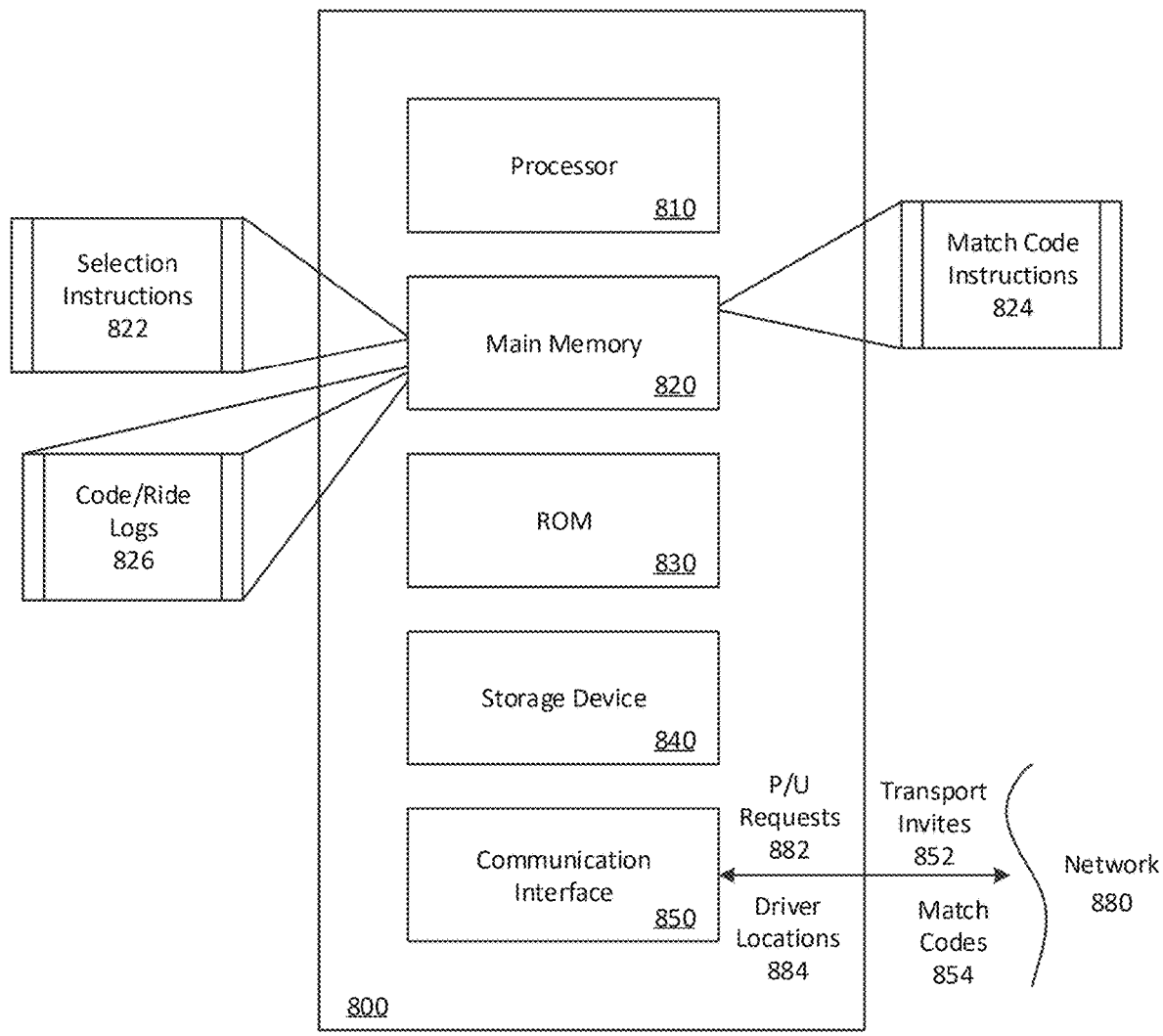
FIG. 8 is a block diagram illustrating a computer system upon which examples described herein may be implemented.

FIG. 8 is a block diagram that illustrates a computer system upon which examples described herein may be implemented. A computer system 800 can be implemented on, for example, a server or combination of servers. For example, the computer system 800 may be implemented as part of a network service for providing transportation services. In the context of FIG. 1, the transport system 100 may be implemented using a computer system 800 such as described by FIG. 8. The transport system 100 may also be implemented using a combination of multiple computer systems as described in connection with FIG. 8.

In one implementation, the computer system 800 includes processing resources 810, a main memory 820, a read-only memory (ROM) 830, a storage device 840, and a communication interface 850. The computer system 800 includes at least one processor 810 for processing information stored in the main memory 820, such as provided by a random access memory (RAM) or other dynamic storage device, for storing information and instructions which are executable by the processor 810. The main memory 820 also may be used for storing temporary variables or other intermediate information during execution of instructions to be executed by the processor 810. The computer system 800 may also include the ROM 830 or other static storage device for storing static information and instructions for the processor 810. A storage device 840, such as a magnetic disk or optical disk, is provided for storing information and instructions.

The communication interface 850 enables the computer system 800 to communicate with one or more networks 880 (e.g., cellular network) through use of the network link (wireless or wired). Using the network link, the computer system 800 can communicate with one or more computing devices, one or more servers, and/or one or more self-driving vehicles. In accordance with examples, the computer system 800 receives pick-up requests 882 from mobile computing devices of individual users. The executable instructions stored in the memory 830 can include selection instructions 822, which the processor 810 executes to select an optimal driver to service the pick-up request 882 in a normal mode. In doing so, the computer system can receive driver locations 884 of drivers operating throughout the given region, and the processor can execute the selection instructions 822 to select an optimal driver from a set of available drivers, and transmit a transport invitation 852 to enable the driver to accept or decline the ride service offer.

The executable instructions stored in the memory 820 can also include match code instructions 824 for a late-binding mode in mass egress scenarios. The match code instructions 824 enable the computer system 800 to respond to pick-up requests 882 within an establish geo-fence area by generating and transmitting match codes 854 to the rider devices in order to enable the riders to directly pair with drivers. Utilizing both the selection instructions 822 and the match code instructions 824, the computer system 800 can manage on-demand transportation services for the given region in normal conditions and mass egress conditions simultaneously. As described herein, the computer system 800 can do so by managing code and ride logs 826 indicating status information for riders and drivers throughout the given region.

By way of example, the instructions and data stored in the memory 820 can be executed by the processor 810 to implement an example transport system 100 of FIG. 1. In performing the operations, the processor 810 can receive pick-up requests 882 and driver locations 884, and submit transport invitations 852 and match codes 854 to facilitate the servicing of the requests 882. The processor 810 is configured with software and/or other logic to perform one or more processes, steps and other functions described with implementations, such as described by FIGS. 1-7, and elsewhere in the present application.

Examples described herein are related to the use of the computer system 800 for implementing the techniques described herein. According to one example, those techniques are performed by the computer system 800 in response to the processor 810 executing one or more sequences of one or more instructions contained in the main memory 820. Such instructions may be read into the main memory 820 from another machine-readable medium, such as the storage device 840. Execution of the sequences of instructions contained in the main memory 820 causes the processor 810 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computing system implementing a service for a given region, the computing system comprising:
    a network communication interface to communicate, over one or more networks, with client devices of users and service providers of the service;
    one or more processors; and
    one or more memory resources storing instructions that, when executed by the one or more processors, cause the computing system to:
        receive, over the one or more networks, a request for the service from a client device of a user;
        in response to receiving the request, generate a unique identifier for the request to facilitate a rendezvous between the user and a service provider;
        transmit, over the one or more networks, the unique identifier to the client device of the user;
        receive, over the one or more networks, data corresponding to the unique identifier from a provider application executing on a client device of the service provider; and
        based on receiving the data corresponding to the unique identifier from the client device of the service provider, transmit, over the one or more networks, an app state update to the client device of the service provider, the app state update causing the provider application to transition from a first state to a second state to indicate that the service has been provided by the service provider for the user.

2. The computing system of claim 1, wherein the unique identifier comprises a unique number displayed on a display screen of the client device of the user, and wherein receiving the data from the client device of the service provider corresponds to the service provider inputting the unique number on the client device of the service provider.

3. The computing system of claim 1, wherein the executed instructions further cause the computing system to:
    transmit, over the one or more networks, a notification indicating a rendezvous location to the client device of the user.

4. The computing system of claim 1, wherein the executed instructions further cause the computing system to:
    transmit, over the one or more networks, trigger data to the provider application executing on the client device of the service provider, the trigger data causing the provider application to enable input of the unique identifier on the client device of the service provider.

5. The computing system of claim 1, wherein the executed instructions further cause the computing system to:
    generate, via a user interface displayed on the client device of the user, rendezvous information providing a location or area at which the user can communicate the unique identifier to the service provider.

6. The computing system of claim 1, wherein the executed instructions further cause the computing system to:
    generate, via a user application executing on the client device of the user, map data causing map content to be displayed on a display screen of the client device of the user, the map content providing navigation directions to rendezvous with the service provider.

7. The computing system of claim 1, wherein the executed instructions further cause the computing system to:
    generate, via the provider application executing on the client device of the service provider, map data causing map content to be displayed on a display screen of the client device of the service provider, the map content providing navigation directions to rendezvous with the user.

8. A non-transitory computer-readable medium storing instructions that, when executed by one or more processors of a computing system, cause the computing system to:
    communicate, over one or more networks, with client devices of users and service providers of a service implemented by the computing system for a given region;
    receive, over the one or more networks, a request for the service from a client device of a user;
    in response to receiving the request, generate a unique identifier for the request to facilitate a rendezvous between the user and a service provider;
    transmit, over the one or more networks, the unique identifier to the client device of the user;
    receive, over the one or more networks, data corresponding to the unique identifier from a provider application executing on a client device of the service provider; and
    based on receiving the data corresponding to the unique identifier from the client device of the service provider, transmit, over the one or more networks, an app state update to the client device of the service provider, the app state update causing the provider application to transition from a first state to a second state to indicate that the service has been provided by the service provider for the user.

9. The non-transitory computer-readable medium of claim 8, wherein the unique identifier comprises a unique number displayed on a display screen of the client device of the user, and wherein receiving the data from the client device of the service provider corresponds to the service provider inputting the unique number on the client device of the service provider.

10. The non-transitory computer-readable medium of claim 8, wherein the executed instructions further cause the computing system to:

transmit, over the one or more networks, a notification indicating a rendezvous location to the client device of the user.

11. The non-transitory computer-readable medium of claim 8, wherein the executed instructions further cause the computing system to:

transmit, over the one or more networks, trigger data to the provider application executing on the client device of the service provider, the trigger data causing the provider application to enable input of the unique identifier on the client device of the service provider.

12. The non-transitory computer-readable medium of claim 8, wherein the executed instructions further cause the computing system to:

generate, via a user interface displayed on the client device of the user, rendezvous information providing a location or area at which the user can communicate the unique identifier to the service provider.

13. The non-transitory computer-readable medium of claim 8, wherein the executed instructions further cause the computing system to:

generate, via a user application executing on the client device of the user, map data causing map content to be displayed on a display screen of the client device of the user, the map content providing navigation directions to rendezvous with the service provider.

14. The non-transitory computer-readable medium of claim 8, wherein the executed instructions further cause the computing system to:

generate, via the provider application executing on the client device of the service provider, map data causing map content to be displayed on a display screen of the client device of the service provider, the map content providing navigation directions to rendezvous with the user.

15. A computer-implemented method of facilitating direct pairings in connection with a service, the method being performed by one or more processors of a computing system and comprising:

communicating, over one or more networks, with client devices of users and service providers of the service;

receiving, over the one or more networks, a request for the service from a client device of a user;

in response to receiving the request, generate a unique identifier for the request to facilitate a rendezvous between the user and a service provider;

transmitting, over the one or more networks, the unique identifier to the client device of the user;

receiving, over the one or more networks, data corresponding to the unique identifier from a provider application executing on a client device of the service provider; and based on receiving the data corresponding to the unique identifier from the client device of the service provider, transmitting, over the one or more networks, an app state update to the client device of the service provider, the app state update causing the provider application to transition from a first state to a second state to indicate that the service has been provided by the service provider for the user.

16. The method of claim 15, wherein the unique identifier comprises a unique number displayed on a display screen of the client device of the user, and wherein receiving the data from the client device of the service provider corresponds to the service provider inputting the unique number on the client device of the service provider.

17. The method of claim 15, further comprising:

transmitting, over the one or more networks, a notification indicating a rendezvous location to the client device of the user.

18. The method of claim 15, further comprising:

transmitting, over the one or more networks, trigger data to the provider application executing on the client device of the service provider, the trigger data causing the provider application to enable input of the unique identifier on the client device of the service provider.

19. The method of claim 15, further comprising:

generating, via a user interface displayed on the client device of the user, rendezvous information providing a location or area at which the user can communicate the unique identifier to the service provider.

20. The method of claim 15, further comprising:

generating, via a user application executing on the client device of the user, map data causing map content to be displayed on a display screen of the client device of the user, the map content providing navigation directions to rendezvous with the service provider.

\* \* \* \* \*